US012693860B2

(12) United States Patent
Rucker et al.

(10) Patent No.: US 12,693,860 B2
(45) Date of Patent: Jul. 28, 2026

(54) PARALLEL INDEX DETERMINATION FOR COMPRESSION INSTRUCTIONS USING PREFIX SUMS IN A PROCESSING PIPELINE

(71) Applicant: Tenstorrent USA, Inc., Austin, TX (US)

(72) Inventors: Alexander C. Rucker, Santa Clara, CA (US); Dongjie Xie, Austin, TX (US)

(73) Assignee: Tenstorrent USA, Inc.

( * ) Notice: Subject to any disclaimer, the term of this patent is extended or adjusted under 35 U.S.C. 154(b) by 4 days.

(21) Appl. No.: 19/035,792

(22) Filed: Jan. 23, 2025

(65) Prior Publication Data

US 2025/0322948 A1     Oct. 16, 2025

Related U.S. Application Data

(60) Provisional application No. 63/634,458, filed on Apr. 15, 2024.

(51) Int. Cl.
*G06F 9/30*        (2018.01)
*G06N 20/00*       (2019.01)
*G06N 5/046*       (2023.01)
(52) U.S. Cl.
CPC ...... *G06F 9/30038* (2023.08); *G06F 9/30032* (2013.01); *G06F 9/30036* (2013.01); *G06F 9/30145* (2013.01); *G06N 20/00* (2019.01); *G06N 5/046* (2013.01)
(58) Field of Classification Search
CPC ............. G06F 9/30038; G06F 9/30032; G06F 9/30036; G06F 9/30145
See application file for complete search history.

(56) References Cited

U.S. PATENT DOCUMENTS 4,490,786 A     12/1984  Nakatani
11,163,564 B1 *  11/2021  Stewart ............... G06F 9/30021
                         (Continued)

FOREIGN PATENT DOCUMENTS

CN     117591184 A     2/2024

OTHER PUBLICATIONS

RISC-V "V" Vector Extension, v1.0, Sep. 20, 2021, pp. 78-88, [retrieved on Mar. 24, 2026]. Retrieved from the Internet <URL: https://github.com/riscvarchive/riscv-v-spec/releases/tag/v1.0>.*

(Continued)

*Primary Examiner* — Shawn Doman
(74) *Attorney, Agent, or Firm* — Daylight Law, P.C.

(57)            ABSTRACT

Systems and methods related to efficient compression instruction handling in a processing pipeline are disclosed herein. A processing pipeline may accept a mask vector from a first register, the mask vector including a set of set bits, and may accept a payload from a second register. The processing pipeline may determine a set of prefix sums for a set of portions of the mask vector by applying the portions to a set of adders in parallel to add the set bits independently for each of the portions. The processing pipeline may determine a set of indexes for the set bits, with respect to the mask vector, in parallel, using the set of prefix sums and the set of portions of the mask vector. The processing pipeline may store a set of identified values from the payload, as identified by the set of indexes, in at least one destination register.

28 Claims, 9 Drawing Sheets

(56)                References Cited

U.S. PATENT DOCUMENTS

| | | | | |
|---|---|---|---|---|
| 2002/0166041 | A1* | 11/2002 | Ramon | G06F 7/764 |
| | | | | 712/E9.019 |
| 2006/0184765 | A1* | 8/2006 | Krueger | G06F 7/76 |
| | | | | 712/E9.034 |
| 2014/0019732 | A1 | 1/2014 | Toll et al. | |
| 2014/0122831 | A1 | 5/2014 | Uliel et al. | |
| 2014/0156708 | A1* | 6/2014 | Adams | G06F 16/168 |
| | | | | 707/803 |
| 2014/0189323 | A1* | 7/2014 | Bharadwaj | G06F 9/30018 |
| | | | | 712/224 |
| 2015/0277912 | A1* | 10/2015 | Gueron | G06F 9/30145 |
| | | | | 712/212 |
| 2017/0344379 | A1* | 11/2017 | Levitan | G06F 9/3802 |
| 2018/0081685 | A1* | 3/2018 | Bhuiyan | G06F 13/4068 |
| 2019/0369992 | A1* | 12/2019 | Plotnikov | G06F 9/30018 |
| 2020/0097289 | A1* | 3/2020 | Eapen | G06F 9/30112 |
| 2021/0224191 | A1 | 7/2021 | Wang et al. | |
| 2021/0366177 | A1* | 11/2021 | Viitanen | G06T 1/20 |
| 2022/0069839 | A1* | 3/2022 | Parker | H03M 7/6023 |
| 2022/0075437 | A1* | 3/2022 | Han | G06N 3/08 |
| 2022/0366008 | A1* | 11/2022 | Shin | G06F 8/41 |
| 2023/0409333 | A1* | 12/2023 | Adelman | G06F 9/30036 |
| 2024/0184584 | A1* | 6/2024 | Wu | G06F 9/30018 |
| 2024/0220259 | A1 | 7/2024 | Tohara et al. | |
| 2024/0231830 | A1* | 7/2024 | Busato | G06F 9/30036 |
| 2025/0199688 | A1* | 6/2025 | Oberberger | G06F 3/0659 |
| 2025/0251940 | A1* | 8/2025 | Nagarajan | G06F 9/3887 |

OTHER PUBLICATIONS

Harris, M, Parallel Prefix Sum (Scan) with CUDA, Mar. 2009, p. 16, [retrieved on Mar. 24, 2026]. Retrieved from the Internet <URL: https://developer.download.nvidia.com/compute/cuda/2_2/sdk/website/projects/scan/doc/scan.pdf >.*

Blelloch, G, Prefix Sums and Their Applications, 1990, [retrieved on Mar. 24, 2026]. Retrieved from the Internet <URL: https://www.cs.cmu.edu/~guyb/papers/Ble93.pdf>.*

Rucker, Alexander, et al. "Capstan: A vector RDA for Sparsity." MICRO-54: 54th Annual IEEE/ACM International Symposium on Microarchitecture, Oct. 17, 2021, pp. 1022-1035, https://doi.org/10.1145/3466752.3480047.

International Search Report and Written Opinion dated Jun. 10, 2025 from International Application No. PCT/US25/23086, 14 pages.

* cited by examiner

FIG. 1
Related Art
Mask <u>101</u>
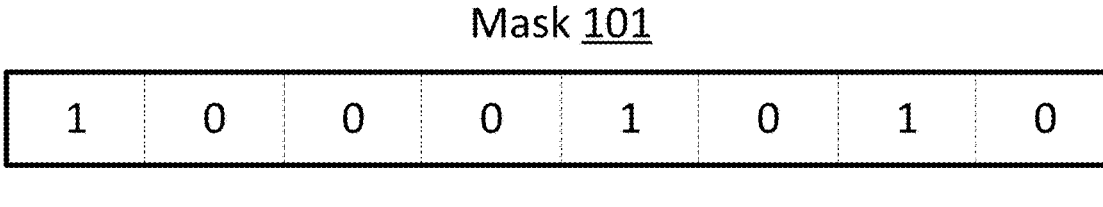
Payload <u>102</u>
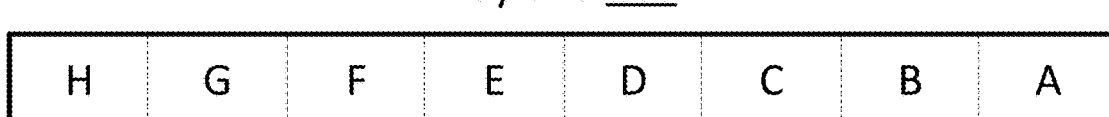
Compression Instruction
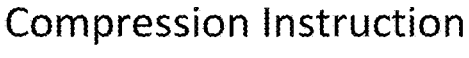
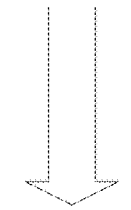
Result Vector <u>103</u>

FIG. 3
Index Register 300
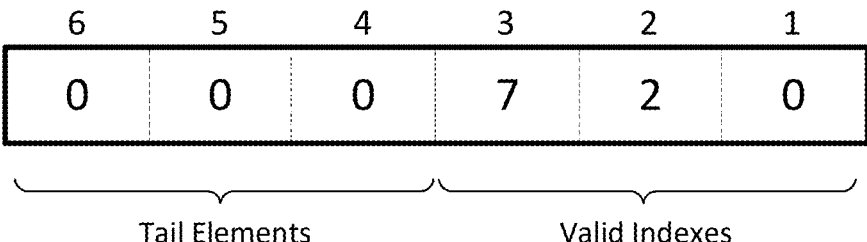
Index Register 310
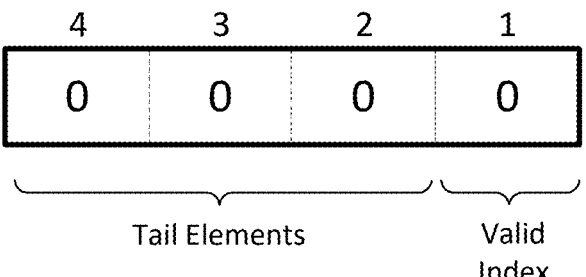
Index Register 320
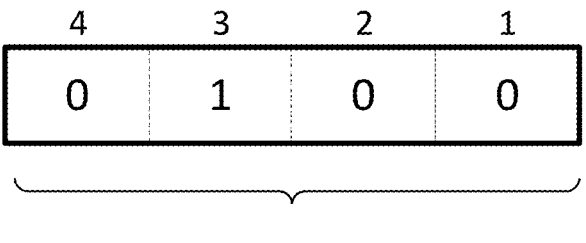

Accept a mask vector from a first register, wherein the mask vector includes a set of set bits ⟍802

Accept a payload from a second register ⟍804

Determine a length of the payload ⟍806

Condition the execution of the determining of the set of prefix sums for the set of portions of the mask vector on the length of the payload being above a threshold ⟍808

Condition a generation of a microoperation on the length of the payload being below the threshold ⟍810

Determine a set of prefix sums for a set of portions of the mask vector by applying the portions in the set of portions to a set of adders in parallel to add the set bits in the set of set bits independently for each of the portions in the set of portions ⟍812

Determine a set of indexes for the set bits in the set of set bits, with respect to the mask vector, in parallel, using the set of prefix sums and the set of portions of the mask vector ⟍814

Store a set of identified values from the payload as identified by the set of indexes in a set of at least one destination registers ⟍816

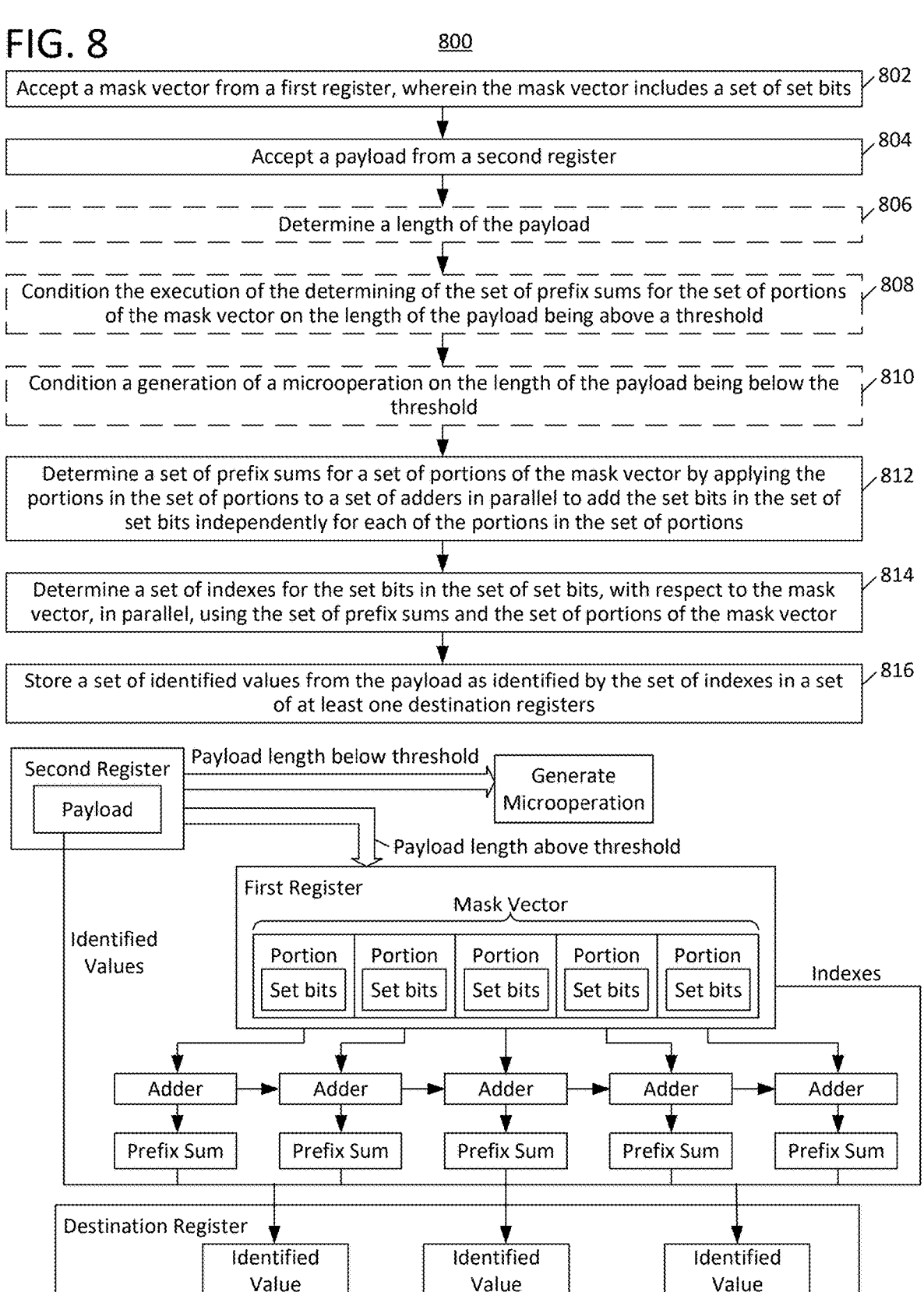

FIG. 9                                    900
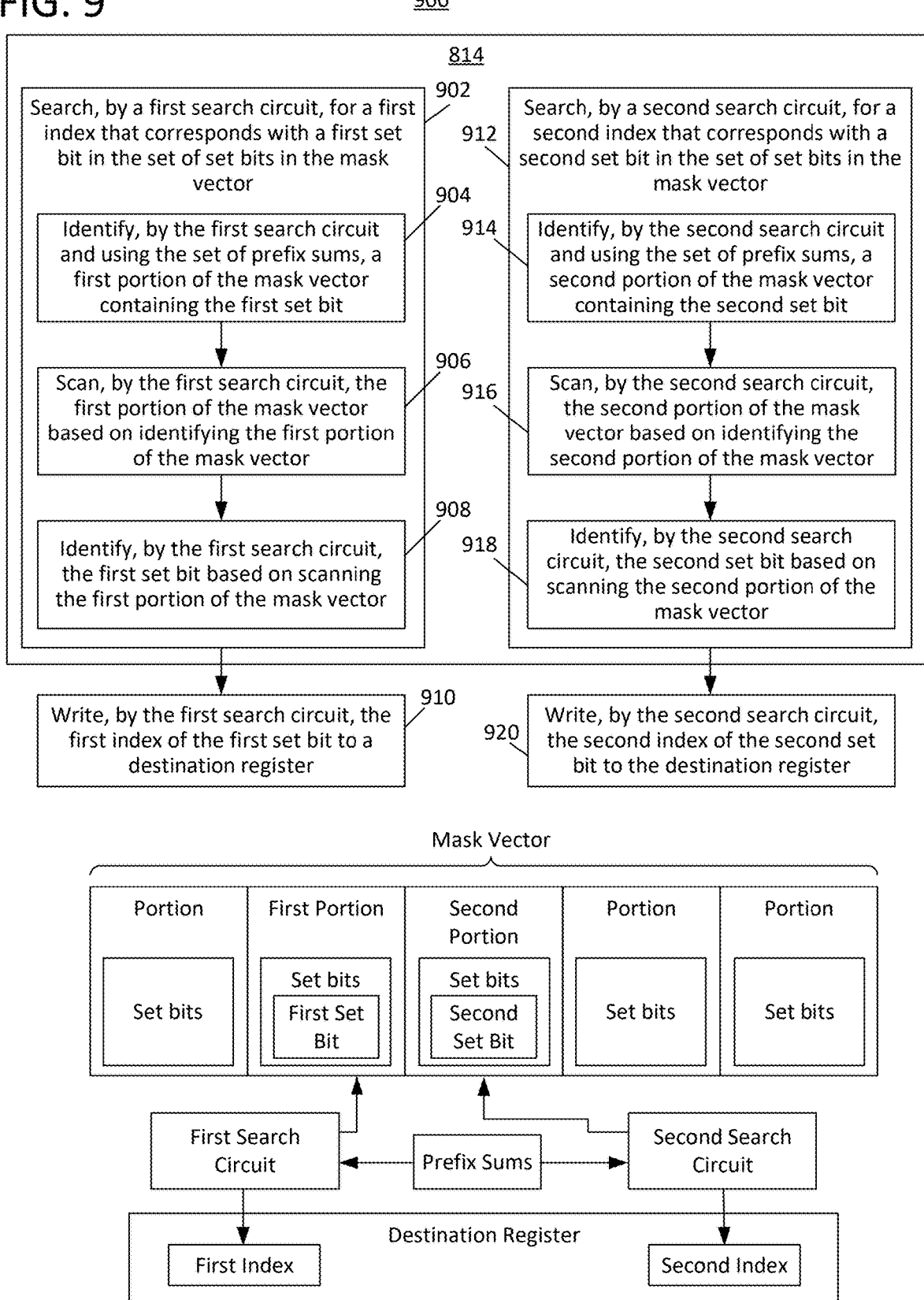

PARALLEL INDEX DETERMINATION FOR COMPRESSION INSTRUCTIONS USING PREFIX SUMS IN A PROCESSING PIPELINE

CROSS REFERENCE TO RELATED APPLICATIONS

This application claims the benefit of U.S. Provisional Patent Application No. 63/634,458, filed Apr. 15, 2024, which is incorporated by reference herein in its entirety for all purposes.

BACKGROUND

The Reduced Instruction Set Computer Five (RISC-V) instruction set includes an instruction called vcompress. RISC-V processing pipelines are able to execute this instruction as part of various workloads such as compressing sparse data or filtering data for other reasons (e.g., selecting all values that are above or below a threshold). The operands of the vcompress instruction are a mask vector and a payload. The mask vector and payload can be identified by the registers in which those values are stored. After the instruction executes, the output is a vector which includes only the selected values from the payload, packed densely at the beginning of the vector. The selected values are the values which correlate with the positions of the set bits in the mask vector.

FIG. 1 provides a flow diagram of the execution of a vcompress instruction. The top of the diagram illustrates the input operands to the vcompress instructions. The operands are mask vector 101 and payload 102. Mask vector 101 is shown with eight entries in which a subset of the entries are set bits (e.g., the "1's"). In actual processing pipelines, the mask vector may be much larger. For example, the mask vector could include 256 entries. Payload 102 is shown with eight entries. The entries are multibit data values of payload 102. For example, the entries could be 8-bit data values. As with the mask vector, the payload may be much larger in actual processing pipelines and will include the same number of entries as the mask. After the compression instruction executes, the result will be vector 103 which only includes the entries that correspond to the set bits in mask vector 101, packed densely at the beginning of vector 103. As illustrated, the result is a vector 103 which includes the second, fourth, and eighth entries of payload 102 because mask vector 101 includes set bits in the second, fourth, and eighth entries.

SUMMARY

Systems and methods related to compression instructions in computer processor pipelines are disclosed herein. While the example of a vcompress instruction in a RISC-V processor pipeline is used as an example throughout this disclosure, the approaches disclosed herein are broadly applicable to compression instructions generally and to processor pipelines that comply with any instruction set architecture. In specific embodiments of the invention, methods and systems are provided that efficiently execute a compression instruction using multiple steps.

The approaches disclosed herein are particularly applicable to compression instructions operating on payloads with numerous data entries such that traditional approaches for searching for the indexes of the mask vector are inefficient. For example, the approaches disclosed herein are beneficially applied to vcompress instructions in a RISC-V processor pipeline operating in accordance with the vector extension of the RISC-V standard because the payloads can include as many as 256 or more entries and the mask vector can therefore have 256 or more set bits to be indexed by the instruction.

In specific embodiments of the invention disclosed herein, processing pipelines are configured to determine the length of a mask for a compression instruction and to modify the manner in which the instruction is executed accordingly. For example, if the length of the instruction is over a threshold, a first set of operations could be conducted to execute the instruction and if the length of the instruction is under a threshold, a second set of operations could be conducted to execute the instruction.

In specific embodiments of the invention, a method for executing a compression instruction in a processing pipeline is provided. The compression instruction can be used to compress a payload for later decompression or simply for purposes of selecting values from the payload without the goal of later decompression of the payload back to its original form.

The first register storing a mask vector could be identified as an operand of the compression instruction. The mask vector may include a set of set bits and may be divided into portions. A second register storing the payload may be identified as an operand of the compression instruction. The number of entries in the mask vector and the payload could be the same. A set of adders may determine the number of set bits in each portion of the mask vector. The set of adders could be configured to add all the set bits in each portion independently and in parallel in order to get a count of the number of set bits in each portion. In specific embodiments, the adders may also, for each portion, add all the set bits in the portions that are below the portion to generate the prefix sums; which can be done combinatorially in parallel. The prefix sums may be used in an efficient search to find specific indexes of the entries of the mask vector in parallel. The prefix sums could be used to break up the searches into chunks to search for indexes in different portions of the mask vector in more than one cycle of searches. Multiple parallel search circuits may search for the indexes that correspond with the set bits in the set of set bits with each one of the circuits searching for a single index. The parallel searches may use the prefix sums as a starting point to determine where to look for the index they are searching for. The indexes may be used to select values from the payload register. The values may be transferred to a destination register to produce the final output of the instruction. The set of identified values as stored in the destination register and the set of indexes may represent a compressed version of the payload as compressed by the mask vector. In alternative approaches, the set of identified values as stored in the destination register may represent a set of selected values from the payload as selected by the mask vector. The methods and systems disclosed herein may allow more efficient execution of compression instructions, especially if the mask has a large number of entries.

In specific embodiments of the invention, a method for executing a compression instruction in a processing pipeline is provided. The method comprises accepting a mask vector from a first register, wherein the mask vector includes a set of set bits. The method further comprises accepting a payload from a second register and determining a set of prefix sums for a set of portions of the mask vector by applying the portions in the set of portions to a set of adders in parallel to add the set bits in the set of set bits independently for each of the portions in the set of portions. The method further comprises determining a set of indexes for the set bits in the set of set bits, with respect to the mask vector, in parallel, using the set of prefix sums and the set of portions of the mask vector. The method further comprises storing a set of identified values from the payload as identified by the set of indexes in a set of at least one destination registers.

In specific embodiments of the invention, a system for executing a compression instruction in a processing pipeline is provided. The system comprises means for accepting a mask vector from a first register, wherein the mask vector includes a set of set bits. The system further comprises means for accepting a payload from a second register and means for determining a set of prefix sums for a set of portions of the mask vector by applying the portions in the set of portions to a set of adders in parallel to add the set bits in the set of set bits independently for each of the portions in the set of portions. The system further comprises means for determining a set of indexes for the set bits in the set of set bits, with respect to the mask vector, in parallel, using the set of prefix sums and the set of portions of the mask vector. The system further comprises means for storing a set of identified values from the payload as identified by the set of indexes in a set of at least one destination registers.

In specific embodiments of the invention, a processor is provided. The processor comprises a processing pipeline executing a compression instruction and a first register storing a mask vector, wherein the mask vector includes a set of set bits. The processor further comprises one or more second registers storing a payload and a set of adders, the set of adders adding, in parallel, set bits in the set of set bits of portions of the mask vector independently for each portion in a set of portions of the mask vector to determine a set of prefix sums for the set of portions of the mask vector. The processor further comprises a set of search circuits with access to the set of prefix sums, the set of search circuits comparing, in parallel, the set bits with at least one prefix sum in the set of prefix sums to determine a set of indexes for the set bits, with respect to the mask vector, using the set of portions of the mask vector. The processor further comprises a set of at least one destination registers storing a set of identified values from the payload as identified by the set of indexes.

BRIEF DESCRIPTION OF THE DRAWINGS

The accompanying drawings illustrate various embodiments of systems, methods, and embodiments of various other aspects of the disclosure. A person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1 provides a flow diagram of the execution of a vcompress instruction in accordance with the related art.

FIG. 3 provides examples of index vectors in accordance with specific embodiments of the inventions disclosed herein.

FIG. 8 provides an example of a method for executing a compression instruction in a processing pipeline in accordance with specific embodiments of the inventions disclosed herein.

FIG. 9 provides an example of a method for determining the set of indexes for the set of bits in the set of set bits of the mask vector in accordance with specific embodiments of the inventions disclosed herein.

DETAILED DESCRIPTION

Figure 2:
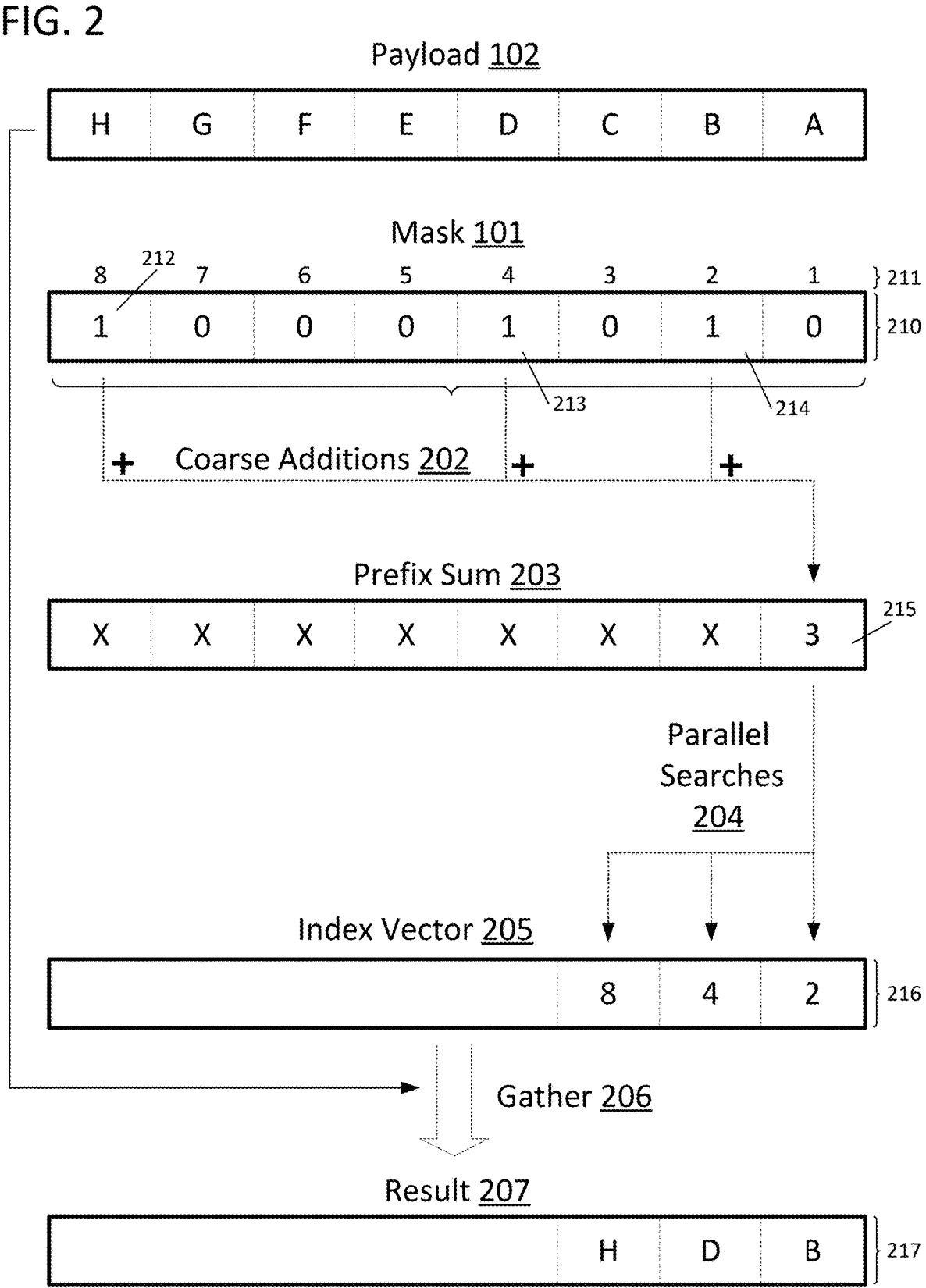
FIG. 2 provides an example of calculating a set of coarse additions for a mask vector and determining a set of indexes for the set bits of the mask vector in accordance with specific embodiments of the inventions disclosed herein.

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different systems and methods for parallel index determination for compression instructions using prefix sums in a processing pipeline in accordance with the summary above are described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Systems and methods related to compression instructions in computer processor pipelines are disclosed herein. While the example of a vcompress instruction in a RISC-V processor pipeline is used as an example throughout this disclosure, the approaches disclosed herein are broadly applicable to compression instructions generally and to processor pipelines that comply with any instruction set architecture. In specific embodiments of the invention, methods and systems are provided that efficiently execute a compression instruction using multiple steps.

The approaches disclosed herein are particularly applicable to compression instructions operating on payloads with numerous data entries such that traditional approaches for searching for the indexes of the mask vector are inefficient. For example, the approaches disclosed herein are beneficially applied to vcompress instructions in a RISC-V processor pipeline operating in accordance with the vector extension of the RISC-V standard because the payloads can include as many as 256 or more entries and the mask vector can therefore have 256 or more set bits to be indexed by the instruction.

In specific embodiments of the invention disclosed herein, processing pipelines are configured to determine the length of a mask for a compression instruction and to modify the manner in which the instruction is executed accordingly. For example, if the length of the instruction is over a threshold, a first set of operations could be conducted to execute the instruction and if the length of the instruction is under a threshold, a second set of operations could be conducted to execute the instruction. The processing pipeline could include an instruction decoder that could evaluate the length of the mask vector, or the status of a configuration register which sets the length of the mask vector, and generate microoperations based on a comparison of that value with a threshold. The value and the threshold could be provided to a comparator in the instruction decoder and the output of the comparator could trigger a first microoperation generation circuit or a second microoperation generation circuit depending on the value output by the comparator.

In specific embodiments of the invention, a method for executing a compression instruction in a processing pipeline is provided. The compression instruction can be used to compress a payload for later decompression or simply for purposes of selecting values from the payload without the goal of later decompression of the payload back to its original form. The method includes accepting a mask vector from a first register. The mask vector could include a set of set bits. The first register could be identified as an operand of the compression instruction. The set bits could be bits of the mask vector that have a value of one and the remaining bits of the mask vector could have values of zero. The accepting of the mask vector could include the instruction identifying the first register to the execution logic of the processing pipeline. The method can also include accepting a payload from a second register. The step could be conducted in parallel with accepting the mask vector from the first register. The payload could include a set of data values. The number of entries in the mask vector and the payload could be the same. For example, both the mask vector and the payload could include 256 entries. The payload could occupy multiple registers. For example, if the entries of the payload were 8-bit data values, the payload could occupy eight registers and the mask vector could occupy one register. The second register, or all the registers in which the payload was stored, could be identified as an operand of the compression instruction. The accepting of the payload could include the instruction identifying the second register, and any other registers in which the payload was stored, to the execution logic of the processing pipeline.

In specific embodiments of the invention, the method can also include determining a set of prefix sums for a set of portions of the mask vector by applying the portions in the set of portions to a set of adders in parallel to add the set bits in the set of set bits independently for each of the portions in the set of portions. The set of adders will thereby determine the number of set bits in each portion of the mask vector. In specific embodiments, the mask vector may be divided into a set of portions that are each 8 entries long. The set of adders may provide a count of the number of set bits per eight entries. The set of adders could be configured to add all the set bits in each portion independently and in parallel in order to get a count of the number of set bits in each portion. In specific embodiments, the adders may also, for each portion, add all the set bits in the portions that are below the portion to generate the prefix sums. This second part of the calculation can be done combinatorially in parallel. Accordingly, the prefix sums may provide a number equal to the number of set bits that are below the portion of the mask vector. This step can be referred to as conducting a set of coarse additions on the mask vector. The methods and systems disclosed herein may allow more efficient execution of compression instructions, especially if the mask has a large number of entries.

FIG. 2 provides an example of calculating a set of coarse additions 202 for mask vector 101 in accordance with specific embodiments of the inventions disclosed herein. Only the first portion of mask vector 101 is shown in the example of FIG. 2, as mask vector 101 may include additional portions. Coarse addition 202 for the first eight entries 210 of mask vector 101 is shown as producing a prefix sum value 215 of 3 in prefix sum vector 203. Prefix sum vector 203 can then be used in an efficient search 204 to find specific indexes 211 of entries 210 of mask vector 101 (e.g., of the set bits 212, 213, and 214 in mask vector 101) in parallel. Prefix sum vector 203 can also be used to determine the number of independent searches 204 to be conducted in parallel to find these specific indexes 211. For example, if the prefix sums determined that there were 64 set bits in the mask vector, then 64 parallel searches could be conducted to find the indexes of those 64 set bits. In specific embodiments in which the logic circuitry for the searches is limited, the prefix sums could be used to break up the searches into chunks to search for indexes in different portions of the mask vector in more than one cycle of searches. For example, prefix sum value 215 (which is 3) may refer to a number of searches for the first portion of mask vector 101.

In specific embodiments of the invention, a method for executing a compression instruction in a processing pipeline can also include determining a set of indexes 216 for the set bits 212, 213, and 214 in the set of set bits, with respect to mask vector 101, in parallel, using the set of prefix sums in prefix sum vector 203 and the set of portions of the mask vector 101. This step can involve multiple parallel search circuits performing searches 204 of indexes 211 for indexes 216 that correspond with the set bits 212, 213, and 214 in the set of set bits in mask vector 101 with each one of the circuits searching for a single index 216. For example, one circuit could be tasked with finding the second set bit 213. This circuit could then use the prefix sum vector 203 to quickly identify that the second set bit 213 is in the first portion of mask vector 101 (e.g., because prefix sum value 215, which is three, is greater than or equal to two). Using this information, the circuit could then scan through the first portion to first find the first set bit 212, and then identify the second set bit 213. Upon identifying the second set bit 213, the search circuitry could write the index 211 of the second set bit 213, which is "4" in the example of FIG. 2, to index vector 205 (e.g., in a destination register). The index of the second set bit 213 may be written in an entry of index vector 205, as an index 216, that corresponds to the second set bit 213 (e.g., the second entry).

FIG. 2 provides an example of determining a set of indexes 216 for the set bits 212, 213, and 214 in the set of set bits, with respect to mask vector 101, in parallel, using the set of prefix sums in prefix sum vector 203 and the set of portions of the mask vector 101. As illustrated, the parallel searches 204 use the prefix sums in prefix sum vector 203 as a starting point to determine where to look for the index 211 they are searching for. In the illustrated case, all the first three indexes (2, 4, and 8) are in the first portion and prefix sum vector 203 indicates this. As such, searches 204 begin with the first portion of mask vector 101 to search for the first three indexes 216 and then store the indexes 216 in index vector 205. Index vector 205 may be stored in an index register or a destination register.

In specific embodiments, the index vector 205 may be stored independently at this point and may persist after the instruction is completed. The index vector 205 can be used to identify a tail of result vector 207 (e.g., a destination register) that stores the compressed payload at a later time. In specific embodiments, a zero in a position of index vector 205 other than the first position may indicate that that position is part of the vector tail. In specific embodiments, an invalid value may be stored in the index vector to indicate that the entire payload is part of the vector tail (i.e., no values were selected from the payload). In alternative embodiments, index vector 205 is not stored in a separate register and is instead used immediately by the processing pipeline to gather the data values of payload 102 identified at indexes 216 into result vector 207 (e.g., stored in the destination register), and the values of index vector 205 do not persist after the execution of the instruction.

In specific embodiments of the invention, the method continues with storing a set of identified values from payload 102 as identified by the set of indexes 216 in a set of at least one destination registers (e.g., including a register storing result vector 207). This step can involve using the indexes 216 to select values from the payload register and transferring them over to a destination register to produce the final output of the instruction. The destination register can be specified in the instruction or it can be a default register. This step is illustrated in FIG. 2 which shows the gather step 206 of values 217 associated with the indexes 216 in index vector 205 being written into result vector 207 (e.g., in a destination register) as the result of the instruction. The set of identified values 217 as stored in result vector 207 and the set of indexes 216 may represent a compressed version of payload 102 as compressed by mask vector 101. In alternative approaches, the set of identified values 217 as stored in result vector 207 may represent a set of selected values from payload 102 as selected by mask vector 101. The methods and systems disclosed herein may allow more efficient execution of compression instructions, particularly if the mask has a large number of entries.

FIG. 3 illustrates examples of index vectors in accordance with specific embodiments of the inventions disclosed herein. In specific embodiments, an index vector may be stored independently and may persist after the instruction is completed. In alternative embodiments, the index vector may not be stored in a separate register and may instead be used immediately by the processing pipeline to gather the data values of the payload identified at the indexes of the index vector into a destination register, and the values of the index vector may not persist after the execution of the instruction.

If an index vector is stored independently, the index vector can be used to identify a tail of the destination register that stores the compressed payload at a later time. In specific embodiments, a zero in a position of an index vector, other than in the first position, may indicate that that position is part of the vector tail. For example, index register 300 includes the value 0 2 7 0 0 0. The last three elements, 0 0 0, may designate themselves as being tail elements. In specific embodiments, a zero in a position of an index vector after a non-zero value may indicate that the position is part of the vector tail.

In specific embodiments, an invalid value may be stored in the index vector to indicate that the entire payload is part of the vector tail (i.e., no values were selected from the payload). For example, the value 0 0 0 0 of index register 310 may indicate one valid index (at position 0), with three tail elements. The value 0 0 1 0 of index register 320 could indicate no valid indexes, with four tail elements.

Figure 4:
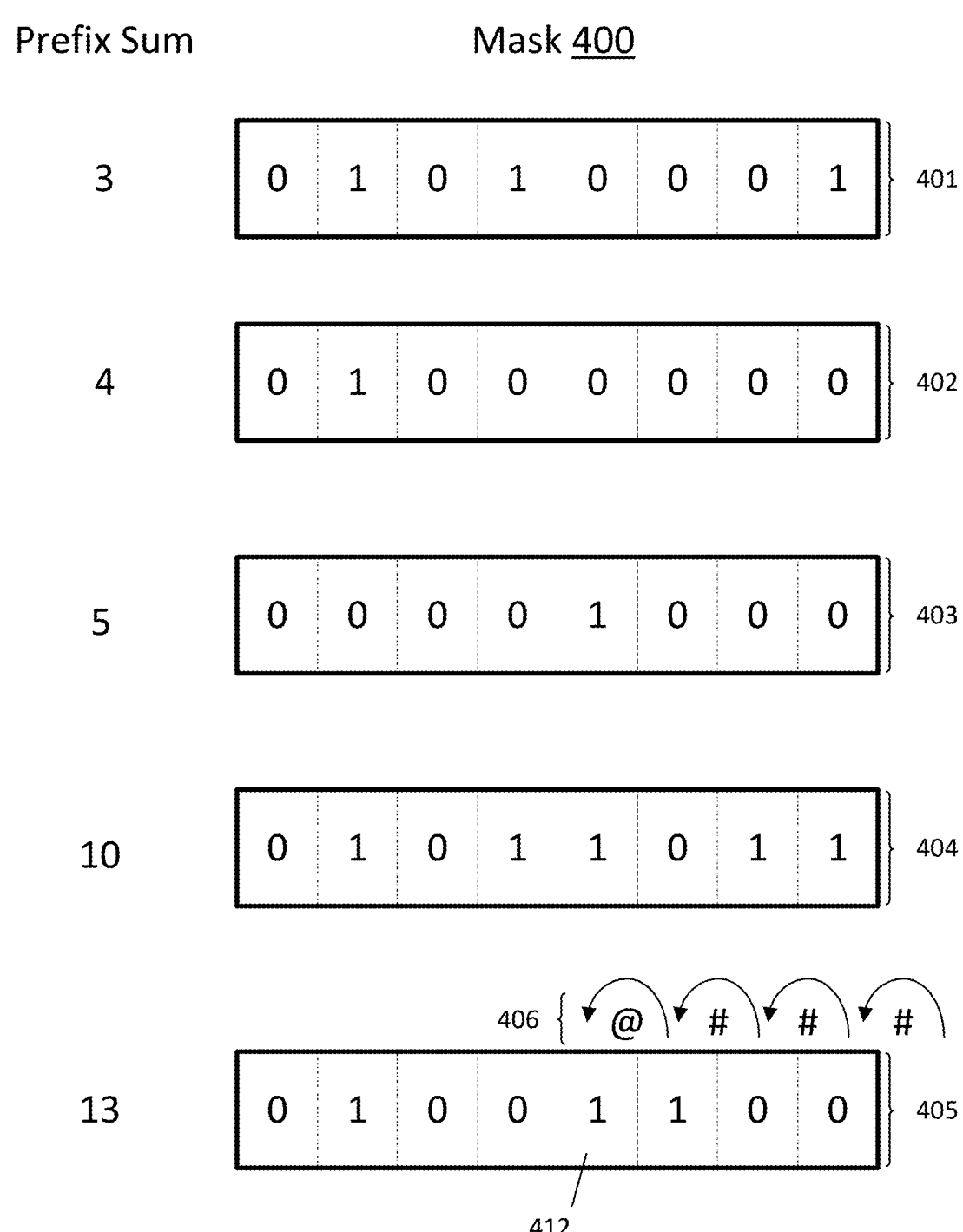
FIG. 4 provides an example of searching for a specific set bit in a mask vector in which the mask vector has been broken into multiple portions and a prefix sum has been calculated for each portion in accordance with specific embodiments of the inventions disclosed herein.

FIG. 4 provides an example of searching for the $12^{th}$ set bit in mask vector 400 in which mask vector 400 has been broken into 5 portions (portions 401, 402, 403, 404, and 405) and a prefix sum has been calculated for each portion in accordance with specific embodiments of the inventions disclosed herein. Each prefix sum value indicates the highest numbered set bit that may be found in the corresponding portion. For example, prefix sum 3 for mask portion 401 indicates that the first, second, and third set bits may be found in mask portion 401. Prefix sum 4 for mask portion 402 indicates that the set bits from, but not including, 3 (the prefix sum of the preceding mask portion 401) up to and including 4 may be found in mask portion 402, namely the single fourth set bit. Prefix sum 10 for mask portion 404 indicates that the set bits from, but not including, 5 (the prefix sum of the preceding mask portion 403) up to and including 10 may be found in mask portion 404, namely the sixth, seventh, eighth, nineth, and tenth set bits.

Searching circuitry may use the prefix sums to identify the portion of mask vector 400 that contains the requested set bit. As illustrated, when searching for the $12^{th}$ set bit 412, the searching circuitry can identify the fifth portion 405 as the portion to search in greater detail because twelve is greater than 10 (the prefix sum of the fourth portion 404) and less than or equal to 13 (the prefix sum of the fifth portion 405). This analysis can be done quickly in parallel using a number of comparators equal to the number of portions (five in this example) of mask vector 400. After identifying which mask portion to analyze, the search circuitry can then engage in a fine-grained search 406 of the fifth portion 405 by checking each value to determine if it is a set bit, tallying the number of set bits that have past, and saving the position of the set bit when the appropriate bit is found (e.g., the $12^{th}$ set bit 412 is found at the fourth entry of the fifth portion 405 of mask vector 400). For example, the searching circuitry may look at the first and second entries of portion 405 and determine they are not set bits. The searching circuitry may find a set bit at the third entry of mask portion 405 and increment one to the prefix sum of the preceding portion 404 to identify the set bit as the $11^{th}$ set bit (ten plus one). The searching circuitry may continue its fine-grained search 406 and may find a set bit at the fourth entry of mask portion 405 and increment one to the tally to identify the set bit as the $12^{th}$ set bit 412 (eleven plus one). In other words, the searching circuitry may identify the $11^{th}$ set bit using a local search and then identify $12^{th}$ set bit 412 using the identification of the $11^{th}$ set bit and a local search.

This fine-grained searching strategy could have instead been applied to the entire mask vector 400, but the number of discrete operations that need to be conducted to do a search on that scale is very large and it cannot be parallelized. In contrast, the search for the $9^{th}$ and $12^{th}$ set bit can be conducted entirely parallel using the approach described with reference to FIG. 4 as the two searches are entirely mutually exclusive. For example, the $9^{th}$ set bit may be found by searching portion 404 while the $12^{th}$ set bit may be found by searching portion 405, and the searches may be done in parallel.

In specific embodiments, search circuitry that is searching for indexes in the same portion of the mask vector (e.g., the $8^{th}$ set bit and the $9^{th}$ set bit in the example of FIG. 4) can use the same fine-grained search. For example, the same fine-grained search portion 404 may find both the index for the $8^{th}$ set bit and the index for the $9^{th}$ set bit. While this is not a parallel operation for the two indexes that are in the same portion, it is more efficient to conduct the fine-grained search once and benefits are still realized because other searches on other portions of the mask may be conducted in parallel, and because the fine-grained search has to move through a maximum number of elements equal to the number of entries in a portion (e.g., eight, in the example of FIG. 4). The number of entries in a portion is smaller than the number of entries in the mask in its entirety, so searching a portion of the mask may still be more efficient then searching the entire mask.

Figure 5:
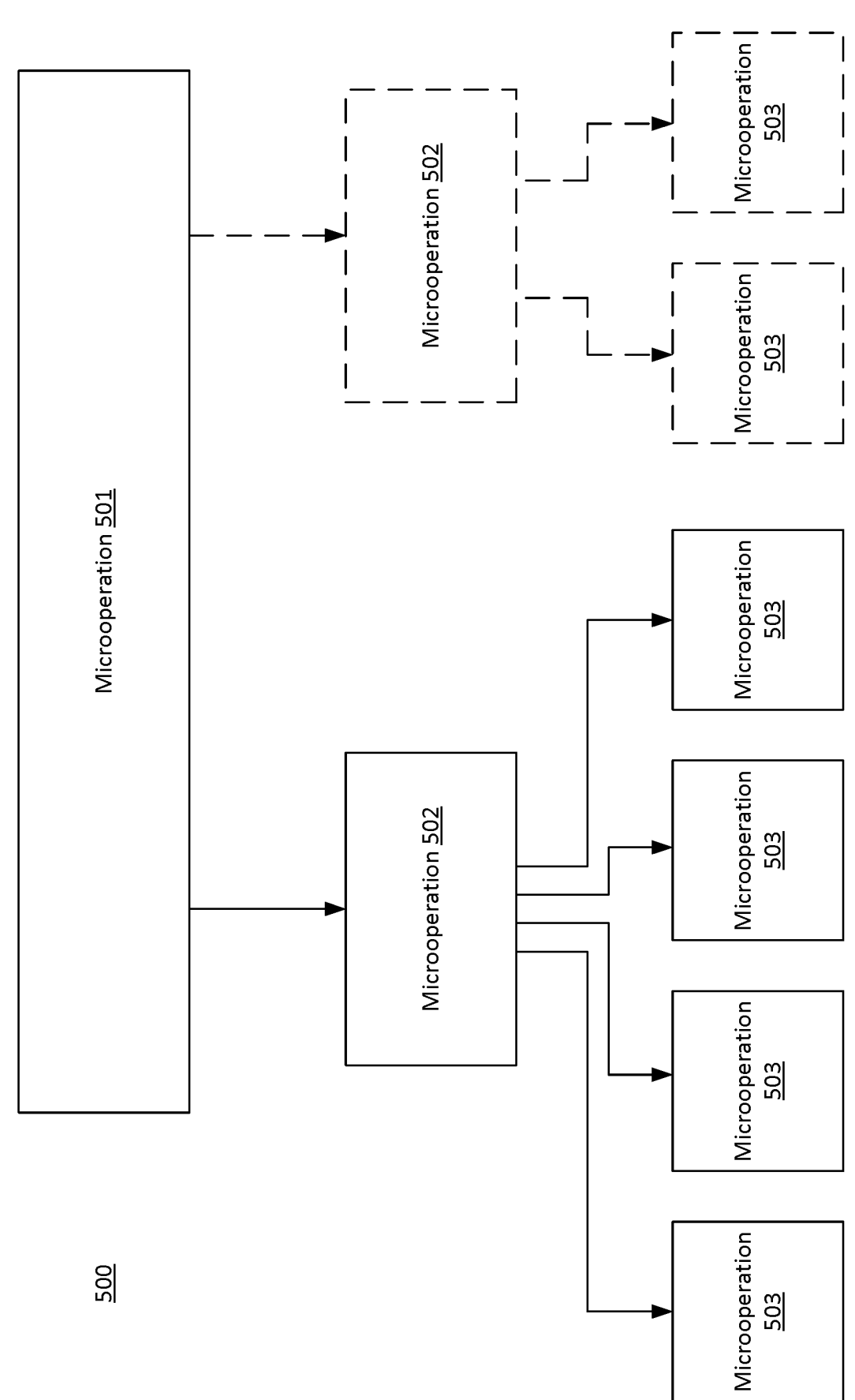
FIG. 5 provides an example of a method for executing a compression instruction in a processing pipeline, the method being broken into microoperations, in accordance with specific embodiments of the inventions disclosed herein.

FIG. 5 illustrates an example of method 500 for executing a compression instruction in a processing pipeline, method 500 being broken into microoperations, in accordance with specific embodiments of the inventions disclosed herein. The compression instruction can be broken into a first microoperation 501, a second microoperation 502, and a third microoperation 503 by the processing pipeline. First microoperation 501 may determine a set of prefix sums for a set of portions of the mask vector by adding the set bits in the set of set bits independently for each portion of the set of portions of the mask vector. Second microoperation 502 may determine a set of indexes for the set bits in the set of set bits, with respect to the mask vector, in parallel, using the set of prefix sums and the set of portions of the mask vector. Third microoperation 503 may store a set of identified values from the payload as identified by the set of indexes in a set of at least one destination registers.

First microoperation 501 can run once per execution of the compression instruction and conducts the determining of the set of prefix sums step disclosed herein. Microoperation 501 can be executed by a set of adders that are connected to the register holding the mask vector. The step of determining a set of prefix sums for a set of portions of the mask vector may be conducted by applying the portions in the set of portions to a set of adders in parallel to add the set bits in the set of set bits independently for each of the portions in the set of portions. The set of adders may thereby determine the number of set bits in each portion of the mask vector. In specific embodiments, the mask vector may be divided into a set of portions that are each 8 entries long. The set of adders may provide a count of the number of set bits per eight entries. The set of adders could be configured to add all the set bits in each portion independently and in parallel in order to get a count of the number of set bits in each portion. In specific embodiments, the adders may also, for each portion, add all the set bits in the portions that are below the portion to generate the prefix sums. This second part of the calculation can be done combinatorially in parallel. Accordingly, the prefix sums may provide a number equal to the number of set bits that are below the portion of the mask vector. In specific embodiments, prefix sums may provide a number equal to the number of set bits that are below the portion of the mask vector and that include the set bits in the corresponding portion of the mask vector. Generating the prefix sums may be referred to as conducting a set of coarse additions on the mask vector.

In specific embodiments, second microoperation 502 can run once per execution, after first microoperation 501 is complete. In specific embodiments, second microoperation 502 may run multiple times per execution of the compression instruction. Second microoperation 502 may conduct the determining of the set of indexes step disclosed herein. Multiple sets of indexes may be determined with multiple microoperations 502. Second microoperation 502 may produce indexes for each destination element (e.g., entry). Due to certain limitations, such as insufficient copies of parallel search logic or insufficient destination register capacity, multiple iterations of second microoperation 502 may be required to produce all the indexes for the set bits. The number of iterations of microoperation 502 for an execution of the compression instruction may be based on the total number of elements divided by the number of indexes each microoperation 502 may be capable of producing. For example, if there are 128 elements and each second microoperation 502 can produce 64 indexes, then second microoperation 502 may be performed twice, as shown in FIG. 5, to complete the determination of the indexes for the set bits. In specific embodiments, the number of iterations of microoperation 502 may be indirectly dependent on the fine-grained search. Various implementations of a system performing microoperation 502 may balance hardware complexity and number of iterations by limiting the number of indexes each microoperation 502 can produce and compensate with more iterations of microoperation 502. Microoperation 502 can be conducted by a set of search circuits with access to the prefix sums. The search circuits can include a set of comparators for comparing the set bit they are searching for with the prefix sums. The search circuits can also include comparators and a counter for searching through the entries in a portion of the mask vector. Multiple iterations of microoperation 502 may be performed in parallel (e.g., there may not be a dependency among iterations of second microoperation 502). Within a single microoperation 502, there can be multiple parallel searches on portions of the vector mask. The search on a single portion of the vector mask may not be completely parallelized. For example, the search for the location of a second set bit may be partially dependent on the location of a first set bit.

In specific embodiments of the invention, second microoperation 502 may include the step of determining a set of indexes for the set bits in the set of set bits, with respect to the mask vector, in parallel, using the set of prefix sums and the set of portions of the mask vector. This step can involve multiple parallel search circuits performing searches for indexes that correspond with the set bits in the set of set bits in the mask with each one of the circuits searching for a single index. The parallel searches may use the prefix sums as a starting point to determine where to look for the index they are searching for. For example, one circuit could be tasked with finding the second set bit. This circuit could then use the prefix sum vector to quickly identify that the second set bit is in the first portion of the mask (e.g., because prefix sum value for that portion of the mask is greater than the number order of the requested bit). Using this information, the circuit could then scan through the first portion to first find the first set bit, and then identify the second set bit. Upon identifying the second set bit, the search circuitry could write the index of the second set bit to a destination register. The index of the second set bit may be written in an entry of index register that corresponds to the second set bit (e.g., the second entry).

In specific embodiments, third microoperation 503 can run once for each destination register of the set of at least one destination registers per execution of the compression instruction. In specific embodiments, third microoperation 503 may run one or more times per execution of second microoperation 502. Third microoperation 503 can conduct the storing of the set of identified values step of executing a compressing instruction in a processing pipeline. In the example of FIG. 5, there are four iterations of microoperation 503 for the left instance of second microoperation 502, meaning there may be four corresponding destination registers for that second microoperation 502. In the example of FIG. 5, there are two iterations of third microoperation 503 for the right instance of second microoperations 502, meaning there may be two corresponding destination registers for that second microoperation 502. Microoperation 503 can be executed by a crossbar that connects the register storing the payload to the destination register with the index values serving as control inputs to the crossbar. Microoperation 503 can be conducted by a multiplexer that connects the register storing the payload to the destination register with the index values serving as control inputs to the multiplexer.

In specific embodiments of the invention, third microoperation 503 may include the step of storing a set of identified values from the payload as identified by the set of indexes in a set of at least one destination registers. This step can involve using the indexes to select values from the payload register and transferring them over to a destination register to produce the final output of the instruction. The destination register can be specified in the instruction or it can be a default register. The values associated with the indexes may be written into a destination register as the result of the instruction. The set of identified values as stored in the destination register and the set of indexes may represent a compressed version of the payload as compressed by the mask vector. In alternative approaches, the set of identified values as stored in the destination register may represent a set of selected values from the payload as selected by the mask vector.

In specific embodiments of the invention, the processing pipeline can be a RISC-V processing pipeline and the compression instruction can be a vcompress instruction. In specific embodiments of the invention, the third microoperation 503 uses a logic circuit that is also used by the processing pipeline when executing a vrgather instruction to select elements from an operand of the vrgather instruction. Generally, a processing pipeline which includes instructions that selects values from a register based on a set of indexes in another register can share the associated logic circuit with the compression instructions disclosed herein to gather the selected or compressed values into a register. In specific embodiments, this shared circuitry can be used to execute the third microoperation 503 described herein.

Figure 6:
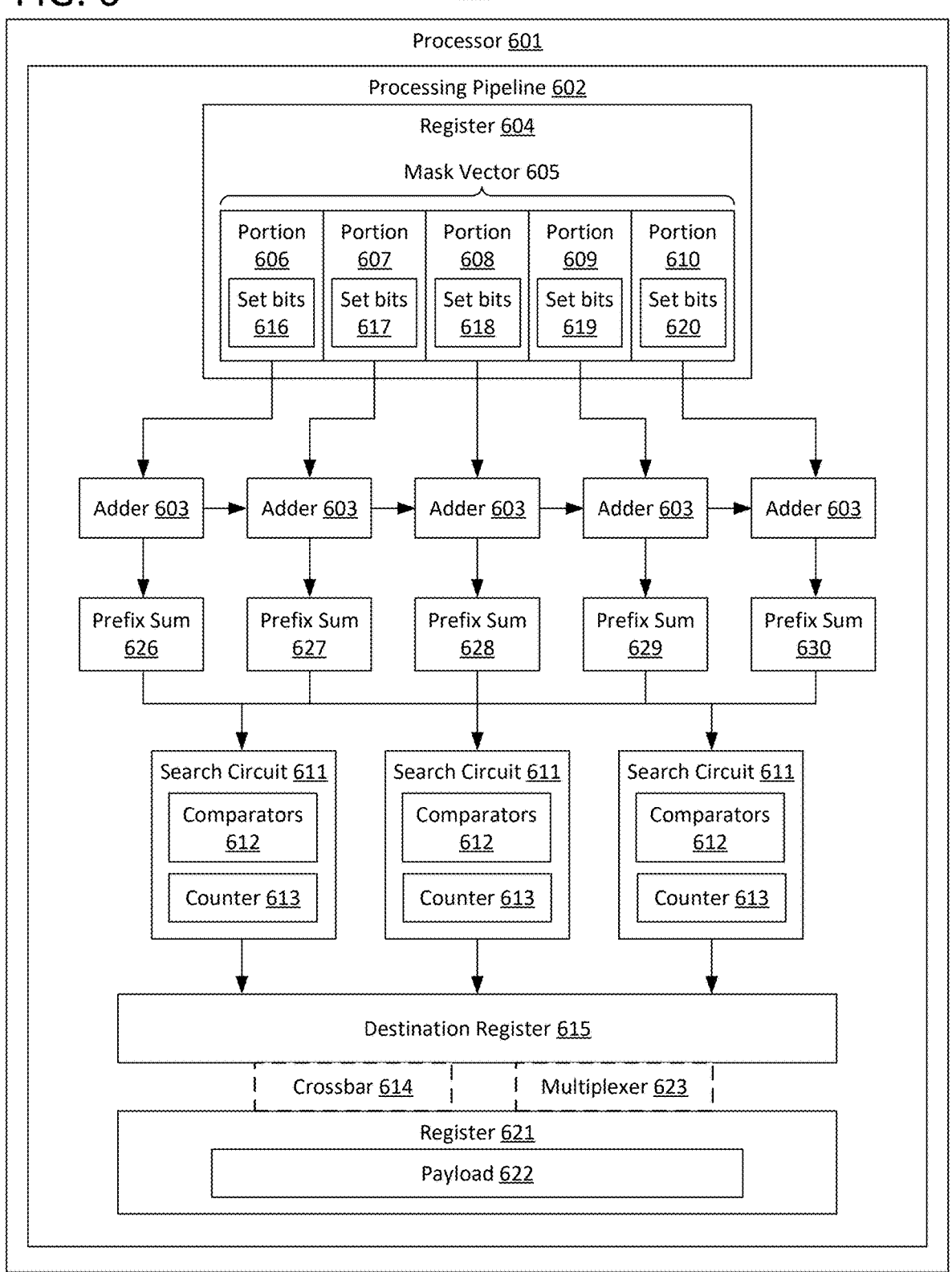
FIG. 6 provides an example of a system for executing a compression instruction in a processing pipeline in accordance with specific embodiments of the inventions disclosed herein.

FIG. 6 illustrates an example of system 600 for executing a compression instruction in a processing pipeline in accordance with specific embodiments of the inventions disclosed herein. In specific embodiments, the compression instruction can be broken into different microoperations. In specific embodiments of the invention, processor 601 can be a RISC-V processor, processing pipeline 602 can be a RISC-V processing pipeline, and the compression instruction can be a vcompress instruction. Processing pipeline 602 may share the associated logic circuit with the compression instructions to gather the selected or compressed values into a register.

Set of adders 603 may be connected to register 604 holding mask vector 605. Mask vector 605 may be divided into different portions such as portions 606, 607, 608, 609, and 610. Although five portions are shown, mask vector 605 may be split into any quantity of portions. Each portion 606, 607, 608, 609, and 610 may include set bits 616, 617, 618, 619, and 620 respectively. Set bits 616, 617, 618, 619, and 620 may refer to any quantity of set bits within the respective portion 606, 607, 608, 609, and 610. For example, portion 609 may have six set bits as indicated by set bits 619; while portion 607 may have zero set bits as indicated by set bits 617.

The portions 606, 607, 608, 609, and 610 of mask vector 605 may be applied to the set of adders 603 in parallel. Adders 603 may add the set bits 616, 617, 618, 619, and 620 independently and in parallel for each portion 606, 607, 608, 609, and 610 of mask vector 605. The set of adders 603 may thereby determine the number of set bits in each portion 606 through 610 of mask vector 605. In specific embodiments, each portion 606 through 610 may be 8 entries long. Accordingly, the set of adders 603 may provide a count of the number of set bits per eight entries of mask vector 605. In specific embodiments, adders 603 may also, for each portion 606, 607, 608, 609, and 610, add all the set bits in the portions that are below the portion to generate prefix sums 626, 627, 628, 629, and 630 respectively. For example, prefix sum 628 may refer to the total number of set bits 616, 617, and 618. As another example, prefix sum 629 may refer to the total number of set bits 616, 617, 618, and 619. This prefix sum calculation can be done combinatorially in parallel. In specific embodiments, prefix sums 626 through 630 may provide a number equal to the number of set bits that are below the portion of the mask vector and that include the set bits in the corresponding portion of the mask vector 605. Generating the prefix sums may be referred to as conducting a set of coarse additions on the mask vector.

A set of search circuits 611 may operate in parallel and may have access to the prefix sums 626 through 630. Although three search circuits 611 are shown, system 600 may include any quantity of search circuits 611. Search circuits 611 can include a set of comparators 612 for comparing the set bit they are searching for (e.g., a requested set bit) with the prefix sums 626 through 630 (e.g., with at least one prefix sum 626 through 630). Search circuits 611 can also include counters 613 for searching through the entries in a portion of mask vector 605. A search circuit 611 may search for a specific index that corresponds with a specific set bit in the set of set bits in mask vector 101. A search circuit 611 may search by identifying a portion (e.g., out of portions 606 through 610) of mask vector 605 containing the specific set bit. The search circuit 611 may scan the identified portion (e.g., portion 608) of mask vector 605 based on identifying the portion. The search circuit 611 may identify the specific set bit based on scanning the specific portion of mask vector 605.

Multiple search circuits 611 may perform searches in parallel for indexes that correspond with the set bits in the set of set bits in mask vector 605 with each one of the search circuits 611 searching for a single index. The parallel searches may use the prefix sums 626 through 630 as a starting point to determine where to look for the index they are searching for. For example, one search circuit 611 could be tasked with finding the second set bit. This circuit could then use prefix sum 626 to quickly identify that the second set bit is in the first portion 606 of mask vector 605 (e.g., because prefix sum 626 for portion 606 may be greater than the two, the number order of the requested bit). Using this information, the search circuit 611 could then scan through portion 606 to first find the first set bit in set bits 616, and then identify the second set bit in set bits 616. Upon identifying the second set bit, the search circuitry 611 could write the index of the second set bit to destination register 615. The index of the second set bit may be written in an entry of the destination register 615 that corresponds to the second set bit (e.g., the second entry).

Destination register 615 may represent a set of destination registers including one or more registers. In specific embodiments, crossbar 614 may connect register 621 storing payload 622 to destination register 615 with the index values serving as control inputs to crossbar 614. In specific embodiments, multiplexer 623 may connect register 621 storing payload 622 to destination register 615 with the index values serving as control inputs to multiplexer 623.

In specific embodiments of the invention, a set of identified values from the payload as identified by the set of indexes may be stored in destination register 615. Storing the set of identified values can involve using the indexes to select values from register 621 and transferring them over to destination register 615 to produce the final output of the instruction. Destination register 615 can be specified in the instruction or it can be a default register. The values associated with the indexes may be written into destination register 615 as the result of the instruction. The set of identified values as stored in destination register 615 and the set of indexes may represent a compressed version of payload 622 as compressed by mask vector 605. In alternative approaches, the set of identified values as stored in destination register 615 may represent a set of selected values from payload 622 as selected by mask vector 605.

Figure 7:
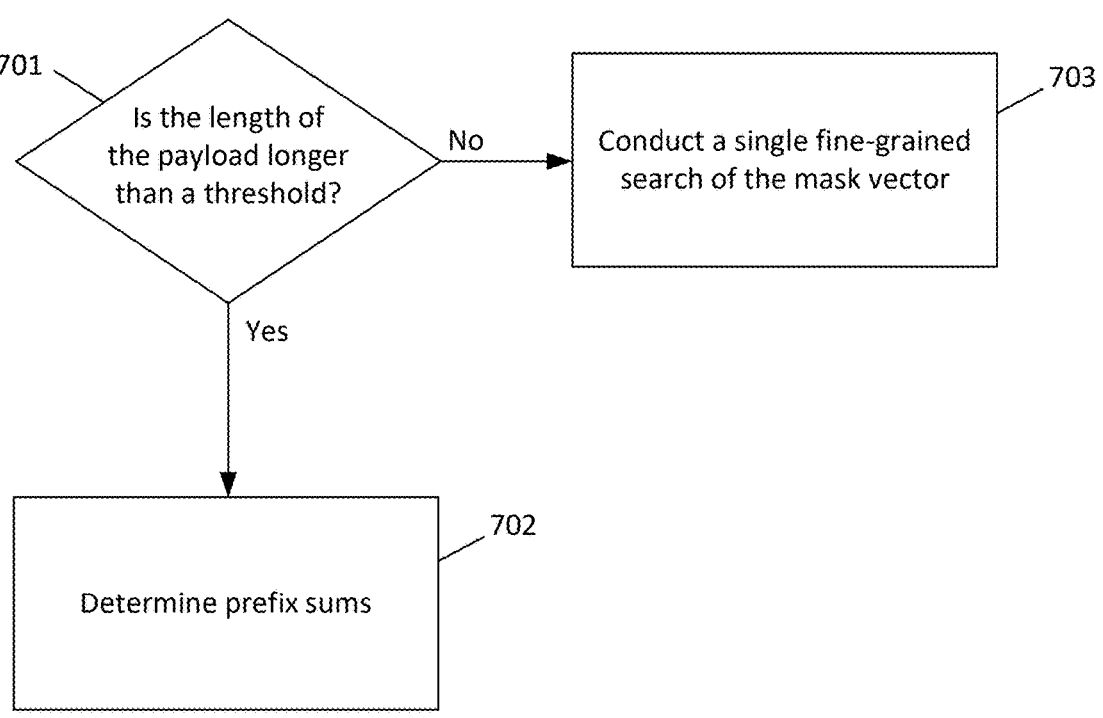
FIG. 7 provides an example of a flowchart for determining whether to calculate prefix sums based on a length of the payload when executing a compression instruction in a processing pipeline in accordance with specific embodiments of the inventions disclosed herein.

FIG. 7 illustrates an example of flowchart 700 for determining whether to calculate prefix sums based on a length of the payload when executing a compression instruction in a processing pipeline in accordance with specific embodiments of the inventions disclosed herein. In specific embodiments, a system implementing flowchart 700 may determine whether to calculate prefix sums based on a length of the mask vector (e.g., instead of based on the length of the payload). In specific embodiments, the payload may include the same number of entries as the mask (e.g., be the same length as the mask). In specific embodiments of the invention, the processing pipeline can be configured to execute a compression instruction in different ways based on the length of the mask vector or on the length of the payload used for the instruction. As such, the processing pipeline can be configured to determine a length of the payload or a length of the mask vector and condition the execution of the instruction based thereon.

At step 701, the processing pipeline can compare the length of the payload (or the mask vector) to a threshold length. If the payload (or mask vector) is longer than the threshold, the flowchart may continue to step 702. If the payload (or mask vector) is not longer than the threshold, the flowchart may continue to step 703.

At step 702, the prefix sums may be determined (e.g., calculated). The prefix sums may be determined according to methods and procedures described herein, for example by applying portions in a set of portions of a mask vector to a set of adders in parallel; the adders may add the set bits in the set of set bits in the mask vector independently for each of the portions in the set of portions. In specific embodiments, other steps not shown in flowchart 700 may be taken based on the determining that the length of the payload is longer than the threshold. For example, a set of indexes for the set bits in the set of set bits may be conditionally determined with respect to the mask vector using the set of prefix sums and the set of portions of the mask vector, based on the length of the payload being longer than the threshold. The set of indexes may be determined in parallel. As another example, a set of identified values from the payload, as identified by the set of indexes, may be conditionally stored in a set of at least one destination registers, based on the length of the payload being longer than the threshold.

At step 703, if the payload is shorter than a threshold, the approaches of step 702 may be bypassed. Instead, a single fine-grained search could be conducted on the mask vector to find the index values for the set bits. Step 703 is merely an example, as, in specific embodiments, the approaches of step 702 may be bypassed with other search strategies implemented instead.

Regardless of the specific search strategy of step 703, the processing pipeline can condition the execution of step 702 of determining a set of prefix sums (e.g., for the set of portions of the mask vector step) on the length of the payload being above a threshold; and condition the execution of the step of determining the set of indexes for the set bits in the set of set bits, with respect to the mask vector, without using the set of prefix sums (e.g., a variation of step 703) on the length of the payload being below a threshold. If the condition for step 703 is met (e.g., conditioned), then the set of prefix sums do not need to be calculated.

In specific embodiments of the invention in which the instruction is executed through the generation of microoperations, the comparison of the length of the vectors (e.g., payload, vector mask) with the threshold could be used to condition the generation of microoperations. For example, a processing pipeline could condition the generation of a microoperation on the length of the payload being below a threshold where the microoperation, if executed (e.g., as part of step 703), would determine the set of indexes for the set bits in the set of set bits, with respect to the mask vector, without using the set of prefix sums. In the alternative or in combination, a processing pipeline could condition the generation of a microoperation on the length of the payload being above a threshold where the microoperation, if executed (e.g., as part of step 702), would compute the prefix sums disclosed above. The generation of other microoperations needed to complete the process of finding the indexes using the prefix sums could be conditioned in the same manner. As used herein the term generating a microoperation refers to generating the data necessary for a processing pipeline to execute a microoperation. In specific embodiments, the processing pipeline will already include the microoperation as a part of the hard coded logic of the processing pipeline such that generating the microoperation refers to generating the data required to execute an instantiation of the microoperation.

FIG. 8 illustrates an example of method 800 for executing a compression instruction in a processing pipeline in accordance with specific embodiments of the inventions disclosed herein. In specific embodiments, the compression instruction may be broken into a first microoperation, a second microoperation, and a third microoperation by the processing pipeline. In specific embodiments, the processing pipeline is a RISC-V processing pipeline and the compression instruction is a vcompress instruction. Method 800 may be implemented by a system including a processing pipeline, a first register storing a mask vector, one or more second registers storing a payload, a set of adders, and a set of at least one destination register. In specific embodiments, the system may include a set of search circuits and a set of comparators. Method 800 may also be implemented by a system including means for performing steps 802 through 816. Steps of method 800 may be omitted, duplicated, rearranged, or otherwise deviate from the form shown.

Additional steps may be inserted into method 800. Steps of method 800 may be performed in parallel, in series, or overlap.

At step 802, a mask vector may be accepted from a first register. The mask vector may include a set of set bits. The set bits could be bits of the mask vector that have a value of one and the remaining bits of the mask vector could have values of zero. The accepting of the mask vector could include the instruction identifying the first register to the execution logic of the processing pipeline.

At step, 804, a payload may be accepted from a second register. Step 804 may be conducted in parallel with step 802. The payload could include a set of data values. The number of entries in the mask vector and the payload could be the same. For example, both the mask vector and the payload could include 256 entries. In specific embodiments, the payload could occupy multiple registers. For example, if the entries of the payload were 8-bit data values, the payload could occupy eight registers and the mask vector could occupy one register. The second register, or all the registers in which the payload was stored, could be identified as an operand of the compression instruction. Step 804 may include the instruction identifying the second register, and any other registers in which the payload was stored, to the execution logic of the processing pipeline.

In specific embodiments, at step 806, a length of the payload may be determined. In specific embodiments, a length of the vector mask may be determined in addition to or instead of the length of the payload. The processing pipeline can be configured to determine a length of the payload or a length of the mask vector and condition the execution of the instruction based thereon.

In specific embodiments, at step 808, the execution of the determining of the set of prefix sums for the set of portions of the mask vector may be conditioned on the length of the payload being above a threshold.

In specific embodiments, at step 810, generation of a microoperation may be conditioned on the length of the payload being below the threshold. The microoperation, if executed, may determine the set of indexes for the set bits in the set of set bits, with respect to the mask vector, without using the set of prefix sums.

At step 812, a set of prefix sums for a set of portions of the mask vector may be determined by applying the portions in the set of portions to a set of adders in parallel to add the set bits in the set of set bits independently for each of the portions in the set of portions. The set of adders may thereby determine the number of set bits in each portion of the mask vector. In specific embodiments, the processing pipeline may break the compression instruction into microoperations. A first microoperation may run once per execution of the compression instruction and may conduct step 812. In specific embodiments, the adders may, for each portion, add all the set bits in the portions that are below the portion to generate the prefix sums; this can be done combinatorially in parallel. Accordingly, the prefix sums may provide a number equal to the number of set bits that are below and including the portion of the mask vector.

At step 814, a set of indexes for the set bits in the set of set bits, with respect to the mask vector, may be determined in parallel, using the set of prefix sums and the set of portions of the mask vector. Step 814 may involve multiple parallel search circuits performing searches for indexes that correspond to the set bits with each one of the circuits searching for a single index. In specific embodiments, search circuitry may use the prefix sums as a starting point to determine where to look for the index they are searching for.

In specific embodiments, the processing pipeline may break the compression instruction into microoperations. A second microoperation may run one or more times per execution of the compression instruction, after the first microoperation is complete, and may conduct step 814. In specific embodiments, a second microoperation may conduct a portion of step 814 such that multiple iterations of the second microoperation may conduct step 814 in its entirety. The second microoperation may produce indexes for each destination element (e.g., entry). Due to certain limitations, such as insufficient copies of parallel search logic or insufficient destination register capacity, multiple iterations of the second microoperation may be required to produce all the indexes for the set bits. The number of iterations of the second microoperation (e.g., second microoperation 502) for an execution of the compression instruction may be based on the total number of elements divided by the number of indexes each second microoperation may be capable of producing. For example, if there are 128 elements and each second microoperation can produce 32 indexes, then the second microoperation may be performed four times to complete the determination of the indexes for the set bits. Various implementations of a system performing method 800 may balance hardware complexity and number of iterations by limiting the number of indexes each second microoperation can produce and compensate with more iterations of second microoperations to complete step 814.

At step 816, a set of identified values from the payload as identified by the set of indexes may be stored in a set of at least one destination registers. Step 816 may involve using the determined indexes to select values from the payload register and transferring them over to a destination register to produce the final output of the instruction. The destination register can be specified in the instruction or it can be a default register. In specific embodiments, the processing pipeline breaks the compression instruction into microoperations. A third microoperation may run once for each destination register of the set of at least one destination registers per execution of the compression instruction and may conduct step 816. In specific embodiments, a third microoperation may conduct a portion of step 816 such that multiple iterations of the third microoperation may conduct step 816 in its entirety. In specific embodiments, the third microoperation may use a logic circuit that is also used by the processing pipeline when executing a vrgather instruction to select elements from an operand of the vrgather instruction. The set of identified values, as stored in the result register, and the set of determined indexes may represent a compressed version of the payload as compressed by the mask vector. In alternative approaches, the set of identified values, as stored in the result register, may represent a set of selected values from the payload as selected by the mask vector.

In specific embodiments, method 800 may be implemented by a system including means for performing each step. The means may include or be implemented on or using one or more processors, microprocessors, embedded processors, digital signal processors, media processors, multiprocessors, controllers, microcontrollers, processing cores, chiplets, integrated circuits, busses, addressable busses, wires, couplings, wireless communications, memory (e.g., dynamic random-access memory (DRAM), static random-access memory (SRAM), cache, registers, etc.), search circuits, logic, amplifiers, adders, multiplexers, crossbars, comparators, etc. More specific means associated with each step of method 800 are provided below. The methods and systems disclosed herein may allow more efficient execution of compression instructions, particularly if the mask has a large number of entries.

For example, step 802 (e.g., accepting a mask vector from a first register) may be performed using a means for accepting a mask vector from a first register. The means for accepting a mask vector from a first register can include execution logic of a processing pipeline. An instruction could identify the first register to the execution logic of the processing pipeline. The means for accepting a mask vector from a first register could include a bus. The means for accepting a mask vector from a first register could include the hardware features mentioned above configured to identifying a mask vector in the first register. The hardware features mentioned above could also be configured to transport the mask vector from the first register to the configuration logic.

For example, step 804 (e.g., accepting a payload from a second register) may be performed using a means for accepting a payload from a second register. The means for accepting a payload from a second register can include execution logic of a processing pipeline. An instruction could identify the second register to the execution logic of the processing pipeline. The means for accepting a payload from a second register could include a bus. The means for accepting a payload from a second register could include the hardware features mentioned above configured to identify a payload in the second register. The hardware features mentioned above could also be configured to transport the payload from the second register to the configuration logic.

For example, step 806 (e.g., determining a length of the payload) may be performed using a means for determining a length of the payload. The means for determining a length of the payload can include an instruction decoder. The means for determining a length of the payload could include a network interface controller (NIC). The means for determining a length of the payload could include the hardware features mentioned above configured to decode a header of the payload. The header of the payload may contain information about the length of the payload (e.g., via a length field). The hardware features mentioned above could also be configured to measure the payload length.

For example, step 808 (e.g., conditioning the execution of the determining of step 812 on the length of the payload being above a threshold) may be performed using a means for conditioning the execution of the determining. The means for conditioning the execution of the determining can include a hardcoded threshold value and a comparator. For example, the length of the payload may be compared to a hardcoded threshold length via the comparator.

The means for conditioning the execution of the determining could include the hardware features mentioned above configured to compare the payload length to the hardcoded threshold length. The means for conditioning the execution of the determining could include a register storing a programmable threshold length and a comparator. For example, the length of the payload may be compared to the programmable threshold length via the comparator. The hardware features mentioned above could also be configured to compare the payload length to the programmable threshold length stored in the register.

For example, step 810 (e.g., conditioning a generation of a microoperation on the length of the payload being below the threshold) may be performed using a means for conditioning a generation of a microoperation. The means for conditioning a generation of a microoperation can include a hardcoded threshold value and a comparator. For example, the length of the payload may be compared to a hardcoded threshold length via the comparator. The means for conditioning a generation of a microoperation could include the hardware features mentioned above configured to compare the payload length to the hardcoded threshold length. The means for conditioning a generation of a microoperation could include a register storing a programmable threshold length and a comparator. For example, the length of the payload may be compared to the programmable threshold length via the comparator. The hardware features mentioned above could also be configured to compare the payload length to the programmable threshold length stored in the register.

For example, step 812 (e.g., determining a set of prefix sums) may be performed using a means for determining a set of prefix sums. The means for determining a set of prefix sums can include adders and accumulators. For example, the adders could be adders 603. The means for determining a set of prefix sums could include input registers and data input lines. The means for determining a set of prefix sums could include the hardware features mentioned above configured to count the number of set bits per portion of the mask vector. In specific embodiments, the hardware features mentioned above may be configured to add all the set bits in the portions of the mask vector that are below a specific portion of the mask vector to generate a prefix sum for that specific portion of the mask vector. The hardware features mentioned above could also be configured to store the numbers or values to be summed and provide access to the data (e.g., from memory, sensors, or external sources).

For example, step 814 (e.g., determining a set of indexes for the set bits in the set of set bits) may be performed using a means for determining a set of indexes. The means for determining a set of indexes can include one or more query registers and one or more data input lines. For example, the one or more query registers and the one or more data input lines could be part of search circuits such as search circuits 611. The means for determining a set of indexes could include one or more comparator circuits such as XOR-based comparators or subtraction-based comparators. For example, the comparator circuits could be part of search circuits such as search circuits 611. The means for determining a set of indexes could include the hardware features mentioned above configured to hold the search key or query data and receive the data to be searched (e.g., from memory or external input). The hardware features mentioned above could also be configured to perform comparisons between the query and stored data to check for a match.

For example, step 816 (e.g., storing a set of identified values from the payload in a set of at least one destination registers) may be performed using a means for storing a set of identified values. The means for storing a set of identified values can include a crossbar connecting the register storing the payload to the set of at least one destination registers. For example, the crossbar could be crossbar 614. The means for storing a set of identified values could include a multiplexer connecting the register storing the payload to the set of at least one destination registers. For example, the multiplexer could be multiplexer 623. The means for storing a set of identified values could include the hardware features mentioned above configured to input index values (e.g., as control inputs). The hardware features mentioned above could also be configured to use the indexes to select values from the payload register and transfer them over to the set of at least one destination registers.

FIG. 9 illustrates an example of method 900 for determining the set of indexes for the set of bits in the set of set bits in accordance with specific embodiments of the inventions disclosed herein. Method 900 may be implemented by a system including a processing pipeline, a first register storing a mask vector, one or more second registers storing a payload, a set of adders, a set of search circuits, and a set of at least one destination register. In specific embodiments, the system may include a set of comparators. Method 900 may also be implemented by a system including means for performing steps 902 through 920. Steps of method 900 may be omitted, duplicated, rearranged, or otherwise deviate from the form shown. Additional steps may be inserted into method 900. Steps of method 900 may be performed in parallel, in series, or overlap.

Method 900 may be incorporated into method 800. Step 814 of method 900 may be the same as step 814 of method 800. For example, method 900 may include the step of determining a set of indexes for the set bits in the set of set bits, with respect to the mask vector, in parallel, using the set of prefix sums and the set of portions of the mask vector.

In specific embodiments, and as part of determining the set of indexes, at step 902, a first search circuit (e.g., in a set of search circuits) may search for a first index that corresponds with a first set bit in the set of set bits in the mask vector. The "first index" may refer to any index within the mask vector, not necessarily the "first" in vector order. Similarly, the "first set bit" may refer to any set bit within the mask vector, not necessarily the "first" in vector order. Likewise, the "first search circuit" may not refer to a particular placement or arrangement of the search circuit within a set of search circuits.

In specific embodiments, and as part of searching for the first index, at step 904, the first search circuit may identify a first portion of the mask vector containing the first set bit. The first search circuit may use the set of prefix sums to identify the first portion of the mask vector.

In specific embodiments, and as part of searching for the first index, at step 906, the first search circuit may scan the first portion of the mask vector based on identifying the first portion of the mask vector (e.g., at step 904).

In specific embodiments, and as part of searching for the first index, at step 908, the first search circuit may identify the first set bit based on scanning the first portion of the mask vector (e.g., at step 906).

In specific embodiments, at step 910, the first search circuit may write the first index of the first set bit to a destination register. In specific embodiments, step 910 may be a part of step 902, a part of step 814, or may be a separate step.

In specific embodiments, and as part of determining the set of indexes, at step 912, a second search circuit (e.g., in the set of search circuits) may search for a second index that corresponds with a second set bit in the set of set bits in the mask vector. The "second index" may refer to any index within the mask vector, not necessarily the "second" in vector order. Similarly, the "second set bit" may refer to any set bit within the mask vector, not necessarily the "second" in vector order. Likewise, the "second search circuit" may not refer to a particular placement or arrangement of the search circuit within a set of search circuits.

In specific embodiments, and as part of searching for the second index, at step 914, the second search circuit may identify a second portion of the mask vector containing the second set bit. The second search circuit may use the set of prefix sums to identify the second portion of the mask vector.

In specific embodiments, and as part of searching for the second index, at step 916, the second search circuit may scan the second portion of the mask vector based on identifying the second portion of the mask vector (e.g., at step 914).

In specific embodiments, and as part of searching for the second index, at step 918, the second search circuit may identify the second set bit based on scanning the second portion of the mask vector (e.g., at step 916).

In specific embodiments, at step 920, the second search circuit may write the second index of the second set bit to a destination register. In specific embodiments, step 920 may be a part of step 912, a part of step 814, or may be a separate step. In specific embodiments, the second search circuit may write the second index to the same destination register that the first search circuit writes the first index to (e.g., at step 910). In other embodiments, the second search circuit may write the second index to a different destination register.

In specific embodiments, method 900 may be implemented by a system including means for performing each step. The means may include or be implemented on or using one or more processors, microprocessors, embedded processors, digital signal processors, media processors, multiprocessors, controllers, microcontrollers, processing cores, chiplets, integrated circuits, busses, addressable busses, wires, couplings, wireless communications, memory (e.g., DRAM, SRAM, cache, registers, etc.), search circuits, logic, amplifiers, adders, multiplexers, crossbars, comparators, etc. More specific means associated with each step of method 900 are provided below. The methods and systems disclosed herein may allow more efficient execution of compression instructions, particularly if the mask has a large number of entries.

For example, step 902 and step 912 (e.g., searching for an index that corresponds with a set bit in the set of set bits in the mask vector) may be performed using a means for searching for an index. The means for searching for an index can include one or more query registers and one or more data input lines. For example, the one or more query registers and the one or more data input lines could be part of search circuits such as search circuits 611. The means for searching for an index could include one or more comparator circuits such as XOR-based comparators or subtraction-based comparators. For example, the comparator circuits could be part of search circuits such as search circuits 611. The means for searching for an index could include the hardware features mentioned above configured to hold the search key or query data and receive the data to be searched (e.g., from memory or external input). The hardware features mentioned above could also be configured to perform comparisons between the query and stored data to check for a match.

For example, step 904 and step 914 (e.g., identifying a portion of the mask vector containing the set bit) may be performed using a means for identifying a portion of the mask vector containing the set bit. The means for identifying a portion of the mask vector containing the set bit can include one or more comparator circuits such as XOR-based comparators or subtraction-based comparators. For example, the comparator circuits could be part of search circuits such as search circuits 611. The means for identifying a portion of the mask vector containing the set bit could include a match indicator and an address output. For example, the match indicator and the address output could be part of a search circuit such as search circuits 611. The means for identifying a portion of the mask vector containing the set bit could include the hardware features mentioned above configured to perform comparisons between the query and stored data to check for a match. The hardware features mentioned above could also be configured to indicate whether a match has been found and output the address or position of the matching data.

For example, step 906 and step 916 (e.g., scanning the portion of the mask vector) may be performed using a means for scanning the portion of the mask vector. The means for scanning the portion of the mask vector can include shift registers. The means for scanning the portion of the mask vector could include pointer or offset logic. The means for scanning the portion of the mask vector could include the hardware features mentioned above configured to shift the mask vector to scan specific portions of the mask vector. The hardware features mentioned above could also be configured to calculate the position of the specific portion of the mask vector for scanning.

For example, step 908 and step 918 (e.g., identifying the set bit) may be performed using a means for identifying the set bit. The means for identifying the set bit can include one or more comparator circuits such as XOR-based comparators or subtraction-based comparators. For example, the comparator circuits could be part of search circuits such as search circuits 611. The means for identifying the set bit could include a match indicator and an address output. For example, the match indicator and the address output could be part of a search circuit such as search circuits 611. The means for identifying the set bit could include the hardware features mentioned above configured to perform comparisons between the query and stored data to check for a match. The hardware features mentioned above could also be configured to indicate whether a match has been found and output the address or position of the matching data.

For example, step 910 and step 920 (e.g., writing the index of the set bit to a destination register) may be performed using a means for writing the index of the set bit to a destination register. The means for writing the index of the set bit to a destination register can include data busses and input data lines. The means for writing the index of the set bit to a destination register could include a write enable control signal and a multiplexer. For example, the multiplexer could be multiplexer 623. The means for writing the index of the set bit to a destination register could include the hardware features mentioned above configured to carry the data to be written into the register and provide the actual data signals. The hardware features mentioned above could also be configured to activate the writing process (e.g., allow the index to be written to the register) and select which data source is active during a write operation.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, while the disclosure was generally directed to the execution of a compression instruction, the approaches disclosed herein are more broadly applicable to a processing pipeline executing any instruction that selects values from a vector based on a set of set bits in a mask register that are arranged relative to the values from the vector. These and other modifications and variations to the present invention may be practiced by those skilled in the art, without departing from the scope of the present invention, which is more particularly set forth in the appended claims.

What is claimed is:

1. A method for executing a compression instruction in a processing pipeline comprising:
    accepting a mask vector from a first register, wherein the mask vector includes a set of set bits;
    accepting a payload from a second register;
    determining a set of prefix sums for a set of portions of the mask vector by applying the portions in the set of portions to a set of adders in parallel to add the set bits in the set of set bits independently for each of the portions in the set of portions;
    determining a set of indexes for the set bits in the set of set bits, with respect to the mask vector, in parallel, using the set of prefix sums and the set of portions of the mask vector; and
    storing a set of identified values from the payload as identified by the set of indexes in a set of at least one destination registers;
    wherein the compression instruction is broken into a first microoperation, a second microoperation, and a third microoperation by the processing pipeline;
    wherein the first microoperation runs once per execution of the compression instruction and conducts the determining of the set of prefix sums;
    wherein the second microoperation runs one or more times per execution of the compression instruction, after the first microoperation is complete, and conducts the determining of the set of indexes; and
    wherein the third microoperation runs once for each destination register of the set of at least one destination registers per execution of the compression instruction and conducts the storing of the set of identified values.

2. The method for executing the compression instruction in the processing pipeline of claim 1, wherein:
    the processing pipeline is a RISC-V processing pipeline;
    the compression instruction is a vcompress instruction; and
    the third microoperation uses a logic circuit that is also used by the processing pipeline when executing a vrgather instruction to select elements from an operand of the vrgather instruction.

3. The method for executing the compression instruction in the processing pipeline of claim 1, further comprising:
    determining a length of the payload; and
    conditioning the execution of the determining of the set of prefix sums for the set of portions of the mask vector on the length of the payload being above a threshold.

4. The method for executing the compression instruction in the processing pipeline of claim 3, further comprising:
    conditioning a generation of a microoperation on the length of the payload being below the threshold;
    wherein the microoperation, if executed, determines the set of indexes for the set bits in the set of set bits, with respect to the mask vector, without using the set of prefix sums.

5. The method for executing the compression instruction in the processing pipeline of claim 1, wherein the determining of the set of indexes for the set bits in the set of set bits comprises:
    searching, by a first search circuit, for a first index that corresponds with a first set bit in the set of set bits in the mask vector, the searching by the first search circuit comprising:
        identifying, by the first search circuit and using the set of prefix sums, a first portion of the mask vector containing the first set bit;
        scanning, by the first search circuit, the first portion of the mask vector based on identifying the first portion of the mask vector; and
        identifying, by the first search circuit, the first set bit based on scanning the first portion of the mask vector; and searching, by a second search circuit, for a second index that corresponds with a second set bit in the set of set bits in the mask vector, the searching by the second search circuit comprising:

identifying, by the second search circuit and using the set of prefix sums, a second portion of the mask vector containing the second set bit;

scanning, by the second search circuit, the second portion of the mask vector based on identifying the second portion of the mask vector; and identifying, by the second search circuit, the second set bit based on scanning the second portion of the mask vector;

wherein the searching by the first search circuit and the searching by the second search circuit are conducted in parallel.

6. The method for executing the compression instruction in the processing pipeline of claim 5, further comprising:

writing, by the first search circuit, the first index of the first set bit to a destination register; and writing, by the second search circuit, the second index of the second set bit to the destination register.

7. A system for executing a compression instruction in a processing pipeline comprising:

means for accepting a mask vector from a first register, wherein the mask vector includes a set of set bits;

means for accepting a payload from a second register;

means for determining a set of prefix sums for a set of portions of the mask vector by applying the portions in the set of portions to a set of adders in parallel to add the set bits in the set of set bits independently for each of the portions in the set of portions;

means for determining a set of indexes for the set bits in the set of set bits, with respect to the mask vector, in parallel, using the set of prefix sums and the set of portions of the mask vector; and means for storing a set of identified values from the payload as identified by the set of indexes in a set of at least one destination registers;

wherein the compression instruction is broken into a first microoperation, a second microoperation, and a third microoperation by the processing pipeline;

wherein the first microoperation runs once per execution of the compression instruction and conducts the determining of the set of prefix sums;

wherein the second microoperation runs one or more times per execution of the compression instruction, after the first microoperation is complete, and conducts the determining of the set of indexes; and wherein the third microoperation runs once for each destination register of the set of at least one destination registers per execution of the compression instruction and conducts the storing of the set of identified values.

8. The system for executing the compression instruction in the processing pipeline of claim 7, wherein:

the processing pipeline is a RISC-V processing pipeline;

the compression instruction is a vcompress instruction; and the third microoperation uses a logic circuit that is also used by the processing pipeline when executing a vrgather instruction to select elements from an operand of the vrgather instruction.

9. The system for executing the compression instruction in the processing pipeline of claim 7, further comprising:

determining a length of the payload; and conditioning the execution of the determining of the set of prefix sums for the set of portions of the mask vector on the length of the payload being above a threshold.

10. The system for executing the compression instruction in the processing pipeline of claim 9, further comprising:

conditioning a generation of a microoperation on the length of the payload being below the threshold;

wherein the microoperation, if executed, determines the set of indexes for the set bits in the set of set bits, with respect to the mask vector, without using the set of prefix sums.

11. The system for executing the compression instruction in the processing pipeline of claim 7, wherein the determining of the set of indexes for the set bits in the set of set bits comprises:

means for searching, by a first search circuit, for a first index that corresponds with a first set bit in the set of set bits in the mask vector, the means for searching by the first search circuit comprising:

means for identifying, by the first search circuit and using the set of prefix sums, a first portion of the mask vector containing the first set bit;

means for scanning, by the first search circuit, the first portion of the mask vector based on identifying the first portion of the mask vector; and means for identifying, by the first search circuit, the first set bit based on scanning the first portion of the mask vector; and means for searching, by a second search circuit, for a second index that corresponds with a second set bit in the set of set bits in the mask vector, the means for searching by the second search circuit comprising:

means for identifying, by the second search circuit and using the set of prefix sums, a second portion of the mask vector containing the second set bit;

means for scanning, by the second search circuit, the second portion of the mask vector based on identifying the second portion of the mask vector; and means for identifying, by the second search circuit, the second set bit based on scanning the second portion of the mask vector;

wherein the searching by the first search circuit and the searching by the second search circuit are conducted in parallel.

12. The system for executing the compression instruction in the processing pipeline of claim 11, further comprising:

means for writing, by the first search circuit, the first index of the first set bit to a destination register; and means for writing, by the second search circuit, the second index of the second set bit to the destination register.

13. A processor comprising:

a processing pipeline executing a compression instruction;

a first register storing a mask vector, wherein the mask vector includes a set of set bits;

one or more second registers storing a payload;

a set of adders, the set of adders adding, in parallel, set bits in the set of set bits of portions of the mask vector independently for each portion in a set of portions of the mask vector to determine a set of prefix sums for the set of portions of the mask vector;

a set of search circuits with access to the set of prefix sums, the set of search circuits comparing, in parallel, the set bits with at least one prefix sum in the set of prefix sums to determine a set of indexes for the set bits, with respect to the mask vector, using the set of portions of the mask vector; and a set of at least one destination registers storing a set of identified values from the payload as identified by the set of indexes;

wherein the compression instruction is broken into a first microoperation, a second microoperation, and a third microoperation by the processing pipeline;

wherein the first microoperation runs once per execution of the compression instruction and conducts the determining of the set of prefix sums;

wherein the second microoperation runs one or more times per execution of the compression instruction, after the first microoperation is complete, and conducts the determining of the set of indexes; and wherein the third microoperation runs once for each destination register of the set of at least one destination registers per execution of the compression instruction and conducts the storing of the set of identified values.

14. The processor of claim 13, wherein:

the processing pipeline is a RISC-V processing pipeline;

the compression instruction is a vcompress instruction; and the third microoperation uses a logic circuit that is also used by the processing pipeline when executing a vrgather instruction to select elements from an operand of the vrgather instruction.

15. The processor of claim 13, wherein:

the execution of the determining of the set of prefix sums for the set of portions of the mask vector is conditioned on a length of the payload being above a threshold.

16. The processor of claim 15, wherein:

a generation of a microoperation is conditioned based on the length of the payload being below the threshold; and the microoperation, if executed, determines the set of indexes for the set bits in the set of set bits, with respect to the mask vector, without using the set of prefix sums.

17. The processor of claim 13, wherein:

a first search circuit in the set of search circuits searches for a first index that corresponds with a first set bit in the set of set bits in the mask vector by: (i) identifying a first portion of the mask vector containing the first set bit, (ii) scanning the first portion of the mask vector based on identifying the first portion of the mask vector, and (iii) identifying the first set bit based on scanning the first portion of the mask vector;

a second search circuit in the set of search circuits searches for a second index that corresponds with a second set bit in the set of set bits in the mask vector by: (i identifying a second portion of the mask vector containing the second set bit, (ii) scanning the second portion of the mask vector based on identifying the second portion of the mask vector, and (iii) identifying the second set bit based on scanning the second portion of the mask vector; and the searching by the first search circuit and the searching by the second search circuit are conducted in parallel.

18. A method for executing a compression instruction in a processing pipeline comprising:

accepting a mask vector from a first register, wherein the mask vector includes a set of set bits;

accepting a payload from a second register;

determining a length of the payload;

determining a set of prefix sums for a set of portions of the mask vector by applying the portions in the set of portions to a set of adders in parallel to add the set bits in the set of set bits independently for each of the portions in the set of portions;

conditioning the execution of the determining of the set of prefix sums for the set of portions of the mask vector on the length of the payload being above a threshold;

determining a set of indexes for the set bits in the set of set bits, with respect to the mask vector, in parallel, using the set of prefix sums and the set of portions of the mask vector; and storing a set of identified values from the payload as identified by the set of indexes in a set of at least one destination registers.

19. The method for executing the compression instruction in the processing pipeline of claim 18, further comprising:

conditioning a generation of a microoperation on the length of the payload being below the threshold;

wherein the microoperation, if executed, determines the set of indexes for the set bits in the set of set bits, with respect to the mask vector, without using the set of prefix sums.

20. A method for executing a compression instruction in a processing pipeline comprising:

accepting a mask vector from a first register, wherein the mask vector includes a set of set bits;

accepting a payload from a second register;

determining a set of prefix sums for a set of portions of the mask vector by applying the portions in the set of portions to a set of adders in parallel to add the set bits in the set of set bits independently for each of the portions in the set of portions;

determining a set of indexes for the set bits in the set of set bits, with respect to the mask vector, in parallel, using the set of prefix sums and the set of portions of the mask vector; and storing a set of identified values from the payload as identified by the set of indexes in a set of at least one destination registers;

wherein the determining of the set of indexes for the set bits in the set of set bits comprises:

searching, by a first search circuit, for a first index that corresponds with a first set bit in the set of set bits in the mask vector, the searching by the first search circuit comprising:

identifying, by the first search circuit and using the set of prefix sums, a first portion of the mask vector containing the first set bit;

scanning, by the first search circuit, the first portion of the mask vector based on identifying the first portion of the mask vector; and identifying, by the first search circuit, the first set bit based on scanning the first portion of the mask vector; and searching, by a second search circuit, for a second index that corresponds with a second set bit in the set of set bits in the mask vector, the searching by the second search circuit comprising:

identifying, by the second search circuit and using the set of prefix sums, a second portion of the mask vector containing the second set bit;

scanning, by the second search circuit, the second portion of the mask vector based on identifying the second portion of the mask vector; and identifying, by the second search circuit, the second set bit based on scanning the second portion of the mask vector;

wherein the searching by the first search circuit and the searching by the second search circuit are conducted in parallel.

21. The method for executing the compression instruction in the processing pipeline of claim 20, further comprising:

writing, by the first search circuit, the first index of the first set bit to a destination register; and writing, by the second search circuit, the second index of the second set bit to the destination register.

22. A system for executing a compression instruction in a processing pipeline comprising:

means for accepting a mask vector from a first register, wherein the mask vector includes a set of set bits;

means for accepting a payload from a second register;

means for determining a length of the payload;

means for determining a set of prefix sums for a set of portions of the mask vector by applying the portions in the set of portions to a set of adders in parallel to add the set bits in the set of set bits independently for each of the portions in the set of portions;

means for conditioning the execution of the determining of the set of prefix sums for the set of portions of the mask vector on the length of the payload being above a threshold;

means for determining a set of indexes for the set bits in the set of set bits, with respect to the mask vector, in parallel, using the set of prefix sums and the set of portions of the mask vector; and means for storing a set of identified values from the payload as identified by the set of indexes in a set of at least one destination registers.

23. The system for executing the compression instruction in the processing pipeline of claim 22, further comprising:

conditioning a generation of a microoperation on the length of the payload being below the threshold;

wherein the microoperation, if executed, determines the set of indexes for the set bits in the set of set bits, with respect to the mask vector, without using the set of prefix sums.

24. A system for executing a compression instruction in a processing pipeline comprising:

means for accepting a mask vector from a first register, wherein the mask vector includes a set of set bits;

means for accepting a payload from a second register;

means for determining a set of prefix sums for a set of portions of the mask vector by applying the portions in the set of portions to a set of adders in parallel to add the set bits in the set of set bits independently for each of the portions in the set of portions;

means for determining a set of indexes for the set bits in the set of set bits, with respect to the mask vector, in parallel, using the set of prefix sums and the set of portions of the mask vector; and means for storing a set of identified values from the payload as identified by the set of indexes in a set of at least one destination registers;

wherein the means for determining of the set of indexes for the set bits in the set of set bits comprises:

means for searching, by a first search circuit, for a first index that corresponds with a first set bit in the set of set bits in the mask vector, the means for searching by the first search circuit comprising:

means for identifying, by the first search circuit and using the set of prefix sums, a first portion of the mask vector containing the first set bit;

means for scanning, by the first search circuit, the first portion of the mask vector based on identifying the first portion of the mask vector; and means for identifying, by the first search circuit, the first set bit based on scanning the first portion of the mask vector; and means for searching, by a second search circuit, for a second index that corresponds with a second set bit in the set of set bits in the mask vector, the means for searching by the second search circuit comprising:

means for identifying, by the second search circuit and using the set of prefix sums, a second portion of the mask vector containing the second set bit;

means for scanning, by the second search circuit, the second portion of the mask vector based on identifying the second portion of the mask vector; and means for identifying, by the second search circuit, the second set bit based on scanning the second portion of the mask vector;

wherein the searching by the first search circuit and the searching by the second search circuit are conducted in parallel.

25. The system for executing the compression instruction in the processing pipeline of claim 24, further comprising:

means for writing, by the first search circuit, the first index of the first set bit to a destination register; and means for writing, by the second search circuit, the second index of the second set bit to the destination register.

26. A processor comprising:

a processing pipeline executing a compression instruction;

a first register storing a mask vector, wherein the mask vector includes a set of set bits;

one or more second registers storing a payload;

a set of adders, the set of adders adding, in parallel, set bits in the set of set bits of portions of the mask vector independently for each portion in a set of portions of the mask vector to determine a set of prefix sums for the set of portions of the mask vector;

a set of search circuits with access to the set of prefix sums, the set of search circuits comparing, in parallel, the set bits with at least one prefix sum in the set of prefix sums to determine a set of indexes for the set bits, with respect to the mask vector, using the set of portions of the mask vector; and a set of at least one destination registers storing a set of identified values from the payload as identified by the set of indexes;

wherein the execution of the determining of the set of prefix sums for the set of portions of the mask vector is conditioned on a length of the payload being above a threshold.

27. The processor of claim 26, wherein:

a generation of a microoperation is conditioned based on the length of the payload being below the threshold; and the microoperation, if executed, determines the set of indexes for the set bits in the set of set bits, with respect to the mask vector, without using the set of prefix sums.

28. A processor comprising:

a processing pipeline executing a compression instruction;

a first register storing a mask vector, wherein the mask vector includes a set of set bits;

one or more second registers storing a payload;

a set of adders, the set of adders adding, in parallel, set bits in the set of set bits of portions of the mask vector independently for each portion in a set of portions of the mask vector to determine a set of prefix sums for the set of portions of the mask vector;

a set of search circuits with access to the set of prefix sums, the set of search circuits comparing, in parallel, the set bits with at least one prefix sum in the set of prefix sums to determine a set of indexes for the set bits, with respect to the mask vector, using the set of portions of the mask vector; and a set of at least one destination registers storing a set of identified values from the payload as identified by the set of indexes;

wherein a first search circuit in the set of search circuits searches for a first index that corresponds with a first set bit in the set of set bits in the mask vector by: (i) identifying a first portion of the mask vector containing the first set bit, (ii) scanning the first portion of the mask vector based on identifying the first portion of the mask vector, and (iii) identifying the first set bit based on scanning the first portion of the mask vector;

wherein a second search circuit in the set of search circuits searches for a second index that corresponds with a second set bit in the set of set bits in the mask vector by: (i) identifying a second portion of the mask vector containing the second set bit, (ii) scanning the second portion of the mask vector based on identifying the second portion of the mask vector, and (iii) identifying the second set bit based on scanning the second portion of the mask vector; and wherein the searching by the first search circuit and the searching by the second search circuit are conducted in parallel.

*     *     *     *     *